(12) United States Patent
Huang et al.

(10) Patent No.: US 7,436,579 B1
(45) Date of Patent: Oct. 14, 2008

(54) MOBILE CHARGE INDUCED PERIODIC POLING AND DEVICE

(75) Inventors: Lee Lisheng Huang, Palo Alto, CA (US); Simon John Field, Los Gatos, CA (US)

(73) Assignee: Arasor Corporation, Mountain View, CA (US)

( * ) Notice: Subject to any disclaimer, the term of this patent is extended or adjusted under 35 U.S.C. 154(b) by 50 days.

(21) Appl. No.: 11/530,336

(22) Filed: Sep. 8, 2006

(51) Int. Cl.
*G02F 1/35* (2006.01)
(52) U.S. Cl. .................. 359/326; 359/332; 385/122
(58) Field of Classification Search ......... 359/326–332; 372/22; 385/122
See application file for complete search history.

(56) References Cited

U.S. PATENT DOCUMENTS

| | | | |
|---|---|---|---|
| 3,384,433 A | 5/1968 | Bloembergen | |
| 4,236,785 A | 12/1980 | Papuchon et al. | 350/96.14 |
| 5,036,220 A | 7/1991 | Byer et al. | 307/427 |
| 5,171,400 A | 12/1992 | Magel et al. | 156/603 |
| 5,193,023 A | 3/1993 | Yamada et al. | 359/245 |
| 5,519,802 A | 5/1996 | Field et al. | 385/129 |
| 5,800,767 A | 9/1998 | Byer et al. | 264/430 |
| 6,565,648 B1 | 5/2003 | Nakamura et al. | 117/2 |
| 7,112,263 B2 * | 9/2006 | Nihei | 204/164 |

OTHER PUBLICATIONS

Bryan et al. "Increased optical damage resistance in Lithium Niobate" Appl. Phys. Lett. vol. 44. pp. 847-849, 1984.

Dierolf et al "Direct write method for domain inversion patterns in liNbO3", Apl Phys Lett vol. 84 No. 20 pp. 3987-3989, 2004.

Fujimura et al "Fabrication of domain inverted gratings in MgO:LiNbO3 by applying voltage under ultraviolet irradiation through photomask at room temperature", Elect Lett vol. 39 No. 9 p. 719-721, 2003.

Harada et al, "Bulk periodically poled MgO:LiNbO3 by corona discharge method", Appl. Phys. Lett vol. 69, No. 18, pp. 2629-2631, 1996, Fuji Photo Film Co Ltd.

Huang et al."A discussion on domain inversion in LiNbO3", Appl. Phys. Lett. vol. 65. pp. 1763-1765, 1994.

Ito et al. "Fabrication of periodic domain grating in LiNbO3 by electron beam writing for application of nonlinear optical processes" Elect. Lett. vol. 27 pp. 1221-1224, 1991.

Keys et al, "Fabrication of domain reversed gratings for SHG in lithium niobate by electron beam bombardment", Electronics Letters, vol. 26, No. 3 pp. 188-189, 1990.

Ming el. al., "The growth striation and ferroelctric domain structures in Czochralski grown LiNbO3 single crystals", Journal of Materials Science, vol. 11, pp. 1663-1670, 1982.

(Continued)

*Primary Examiner*—Hemang Sanghavi
(74) *Attorney, Agent, or Firm*—Heller Ehrman LLP

(57) ABSTRACT

Devices and methods are disclosed for realizing a high quality bulk domain grating structure utilizing mobile charges that are generated by means of photo-excitation in a substrate. An effect of light exposure (UV, visible, or a combination of wavelengths) is to generate photo-induced charges. The application of a voltage across the substrate combined with the application of light exposure causes a photo-induced current to flow through the substrate. The photo-induced charges (behaving like virtual electrode inside the material) and the photo-induced current result in both reduction of the coercive field required for domain inversion in the material and improve realization of the domain inversion pattern, which previously has not been possible at room temperature.

49 Claims, 10 Drawing Sheets

OTHER PUBLICATIONS

Mizuuchi et al "Electric field poling in Mg doped LiNbO3", Journal of Applied Phys, vol. 96, No. 11, pp. 6585-6590, Dec. 1, 2004.

Mizuuchi et al, "Efficient second harmonic generation of 340nm light in a 1.4 μm periodically poled bulk MgO:LiNbO3", Jpn J Appl Phys vol. 42, pp. L90-L91, 2003.

Muller et al, "Influence of ultraviolet illumination on the poling characteristics of lithium niobate crystals", Appl Phys Lett vol. 83 No. 9, pp. 1824-1826 2003.

Nakamura et al, "Periodic poling of magnesium oxide doped lithium niobate", Jnl. Appl Phys, vol. 91, No. 7, pp. 4528-4534, Apr. 1, 2002.

Valdivia et al, "Nanoscale surface domain formation on the + Z face of lithium niobate by pulsed ultraviolet laser illumination", Appl Phys Lett vol. 86, 2005.

Yamada et al., "Fabrication of periodically reversed domain structure for SHG in LiNbO3 by direct electron beam lithography at room temperature", Elect. Lett. vol. 27, pp. 828-829, 1991.

* cited by examiner

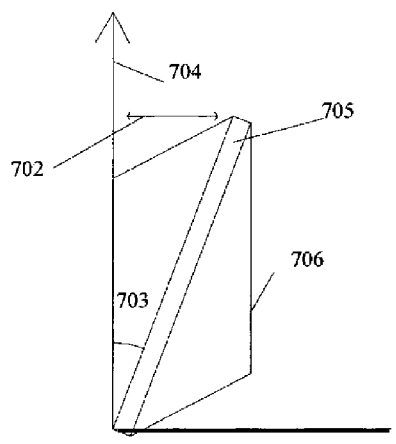 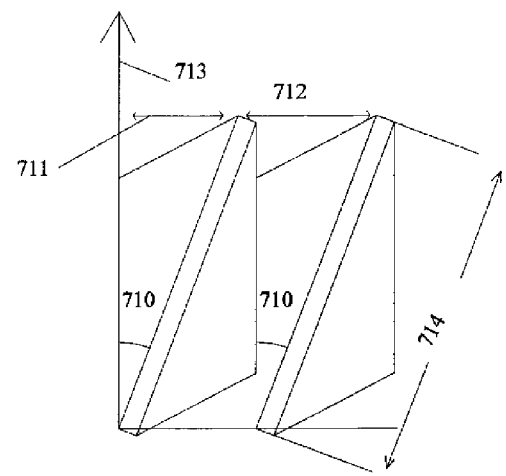
FIG. 7a.  FIG. 7b.
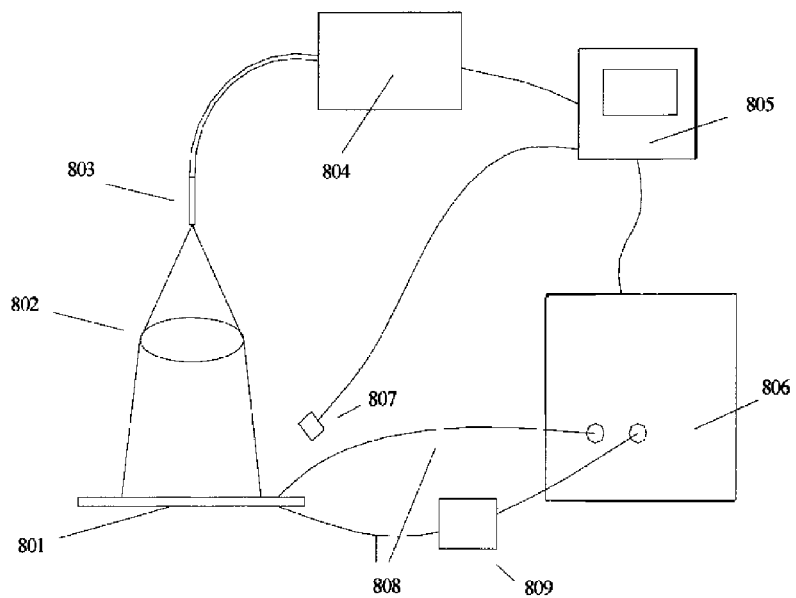
FIG 8.

MOBILE CHARGE INDUCED PERIODIC POLING AND DEVICE

BACKGROUND OF THE INVENTION

1. Field of the Invention

This invention relates generally to high quality short period bulk domain inversion structures (gratings), and more particularly to high quality short period bulk domain inversion structures (gratings) that are fabricated in substrate materials such as MgO doped congruent lithium niobate using electric field poling.

2. Description of the Related Art

Quasi phase matching (QPM) is an efficient way to achieve nonlinear optical interactions. The approach was first proposed by Bloembergen et al, U.S. Pat. No. 3,384,433, using a domain inversion grating structure to achieve QPM. Such a domain grating structure can be usefully realized in an optically transparent ferroelectric material, such as LiNbO3, LiTaO3, and KTP. There are many different ways to achieve inverted domain structures in these materials.

A periodic poled material structure can be grown directly within the material by modifying a parameter during the growth process, such as temperature, or a dopant concentration. Ming el. al. ("*The growth striation and ferroelectric domain structures in Czochralski grown LiNbO3 single crystals*" Journal of materials Science, v11, p. 1663, 1982.) used variation of temperature, growth rate and solute concentration during Czochralski growth to create a periodic structure in Lithium Niobate. Laser heated pedestal growth is disclosed in U.S. Pat. No. 5,171,400 by Magel et. al. from Stanford University. This method can produce gratings with periods as short as 6 μm and 4 μm, but it is difficult grow long lengths and curvature of the domains limits the lateral dimensions and efficiency.

Impurity doping or material removal in some ferroelectric materials (such as lithium niobate and KTP) can result in domain inversion. In lithium niobate, periodic domain inversion gratings can be achieved through high temperature processes such as titanium indiffusion, lithium outdiffusion (in air, or enhanced with surface layers of SiO2 and MgO) or proton exchange. A mechanism for the domain inversion was proposed by one of the present inventors, based on space charge field of impurity gradients (Huang et al. "*A discussion on domain inversion in LiNbO3*" Appl. Phys. Lett. v 65. p. 1763, 1994). Byer et al, at Stanford University, U.S. Pat. No. 5,036,220, demonstrated a waveguide frequency converter wherein the domain structure was created using titanium indiffusion in lithium niobate.

Due to the typically shallow impurity diffusion depths, the inverted domains are also typically shallow and generally triangular or semicircular in depth in lithium niobate.

A high voltage may be used to generate domain inversion at room temperature. Papuchon (U.S. Pat. No. 4,236,785) demonstrated patterned electric field inplane poling on lithium niobate to achieve waveguide quasi-phasematched nonlinear interactions. Short period domain inversion in Z-cut congruent lithium niobate was first demonstrated by Yamada at Sony in 1992, U.S. Pat. No. 5,193,023 but the described process suffered from limitations in the material thickness and high instances of destructive electrical breakdown. Since this first report many different techniques of applying the electric field have been demonstrated, generally enabling electric field induced domain inversion to be achieved at or near to room temperature, in contrast to the methods of Class 2. Approaches include the use of patterned metal electrodes, patterned insulators with liquid electrodes, U.S. Pat. No. 5,800,767, U.S. Pat. No. 5,519,802, and corona discharge charging (Harada et al. "*Bulk periodically poled MgO:LiNbO3 by corona discharge method*", Appl. Phys. Lett V 69, #18, 1996, Fuji Photo Film Co Ltd). The common feature of all of these approaches is the creation of a localized electric field modulation (or patterned electric field) on one face of the crystal substrate.

Bombardment with a high energy electron beam can be used to induce bulk domain inversion in congruent lithium niobate at room temperature as demonstrated by Yamada from Sony (Yamada et al. "*Fabrication of periodically reversed domain structure for SHG in LiNbO3 by direct electron beam lithography at room temperature*" Elect. Lett. Vol 27 p. 828, 1991), without the use of an applied voltage. Ito et. al. also performed electron beam writing of domain grating in lithium nioate (Ito et al. "*Fabrication of periodic domain grating in LiNbO3 by electron beam writing for application of nonlinear optical processes*" Elect Lett. Vol 27 p. 1221, 1991). The high energy electrons incident on the substrate penetrate the surface and are trapped inside the substrate. These localized trapped electrons in the material result in localized high electric field that causes domain inversion. Earlier work by Keys et al (Keys et al, "*Fabrication of domain reversed gratings for SHG in lithium niobate by electron beam bombardment*". Electronics Letters, V26, #3 p 188, 1990) used a mask to pattern the bombardment of a high energy electron beam on congruent lithium niobate, and combined with an elevated temperature and a small applied voltage, this was demonstrated to provide patterned domain inversion.

In essence, all the methods described above are electric field poling. The orientation of the internal dipole moment is reversed under the influence of the local and global electric field. In direct growth, and impurity diffusion approaches the electric field is generated from a temperature gradient, or a dopant gradient. With electron beam bombardment the electric field is created by the trapped electrons injected into the substrate from a high energy beam.

Early work in electric field poling for QPM applications concentrated largely on congruent lithium niobate since this is by far the most widely available nonlinear optical material and also one of the most versatile, with a transparency range from about 400 nm to 5 microns in wavelength. However, as applications have come to be developed for the visible spectrum, the large numbers of defects in the congruent crystal structure, together with trace impurities incorporated during the growth process, give rise to a property called photorefractivity. The photorefractive effect is caused by the directional drift of photo-excited charges generated by absorption of visible and UV light within the material, which creates a space-charge electric field. The space-charge electric field leads, via the electro-optic effect, to a refractive index change which distorts the optical beam passing through the crystal. In order to be used in applications using or generating visible light, congruent lithium niobate needs to be doped with about 5% MgO, as shown by Bryan et. al, (Bryan et al "*Increased optical damage resistance in Lithium Niobate*" Appl. Phys. Left. V44. p 847, 1984) to overcome the effects of structural defects and eliminate the photorefractive effect.

However the MgO dopant in MgO:CLN brings an even bigger challenge in realizing periodic domain structures. Many groups of researchers around the world have been working on electric field poling of MgO:CLN. For example, corona poling was attempted by Fuji (R10, R19); the use of elevated temperatures was attempted by Mitsubishi Cable (U.S. Pat. No. 6,565,648), and Matsushita (Mizuuchi et al "*Electric field poling in Mg doped LiNbO3*", Jpn J Appl Phys, V96, #11, 2004, Mizuuchi et al "*Efficient second harmonic generation of 340 nm light in a 1.4 um periodically poled bulk MgO:LiNbO3*", *Jpn J Appl Phys* V42, p 90-91, 2003); ultraviolet light, and laser light energy assisted poling has been attempted by several other groups (Muller et al "*Influence of ultraviolet illumination on the poling characteristics of lithium niobate crystals*" *Apl Phys Left* V83 #9 p 1824 2003, Valdivia et al "*Nano scale surface domain formation on the +Z face of lithium niobate by pulsed ultraviolet laser illumination*", *Appl Phys Lett* V86 2005, Fujimura et al "*Fabrication of domain inverted gratings in MgO:LiNbO3 by applying voltage under ultraviolet irradiation through photomask at room temperature*", *Elect Lett* V39 #9 p 719 2003, Dierolf et al "*Direct write method for domain inversion patterns in liNbO3*", *Apl Phys Left* V84 #20 p 3987 2004). However short-period-domain-grating structures have not been achieved at room temperature in a reliable and repeatable manner.

Part of the difficulty in poling MgO:CLN is the observation that there is current flow through the substrate other than the poling displacement current during the poling process. This current flow results in preferential growth of domains which are formed early in the poling process and disrupts the domain seeding uniformity and therefore the uniformity of the final grating pattern.

It is also found that the domain wall boundary in Mg doped CLN seems to not be aligned as rigidly along the crystal axis as in the undoped CLN material. Since the inverted domain structure does not strictly follow the crystal structure, it is fundamentally challenging for the inverted domain to propagate through the entire thickness of the substrate while maintaining the lateral dimensions of the masking pattern applied on one surface of the substrate.

Accordingly, there is a need to provide an improved domain inverted grating device with high efficiency and high resistance to photorefractive effects and a fabrication method able to control the domain growth through the bulk of the crystal for short period domain inversion gratings for applications in high power visible light generation.

SUMMARY

Accordingly, an object of the present invention is to provide a domain grating device, and its associated fabrication methods, that has controlled domain growth through the bulk of the crystal for uniform short period domain inversion gratings.

Another object of the present invention is to provide a domain grating device fabrication method, using the generation of mobile charges in a substrate to improve the seeding of inverted domains and to guide the growth of the domains through the bulk of the substrate for improved poling quality.

Another object of the present invention is to provide an improved domain grating device that results in high efficiency bulk domain grating devices for applications in generating high power visible laser light. This is achieved in a domain grating device that has a substrate with first and second opposing surfaces. The substrate has an inverted domain grating structure that extends through the entire substrate. An inverted domain duty cycle at the first surface is greater than 50% and less than 100%, and an inverted domain duty cycle at the second surface is less than 50% and greater than 0% ensuring a region of 50% duty cycle within the substrate.

In another embodiment of the present invention, a method is provided for creating an improved domain grating device. A substrate is provided with first and second opposing surfaces. Optical illumination is used to generate mobile charges and patterned current flows. An inverted domain grating structure is formed that extends through the entire substrate. A domain duty cycle at the first surface is greater than 50% and less than 100%, and a domain duty cycle at the second surface is less than 50% an greater than 0%.

BRIEF DESCRIPTION OF THE DRAWINGS

FIG. 7. illustrates the effect of domain inversion mask misalignment on poling for one embodiment of the present invention.

FIG. 8. illustrates a typical experimental configuration for an Illuminated electric field poling process that can be used with one embodiment of the present invention.

DETAILED DESCRIPTION

In one embodiment of the present invention, an improved domain inversion structure is provided that has optimized efficiency, reliable fabrication and ease of characterization.

This improved domain inversion structure is the result of a new high voltage electric field poling based fabrication process which involves the generation of mobile charges within the substrate that is to be poled, accompanied by the application of a patterned high voltage electric field. This combination results in a patterned current flow through the substrate and creates a patterned domain inversion structure within the substrate. Various combinations of charge generation and voltage application can be used to tailor the size and shape of the domain inverted regions.

Figure 1:
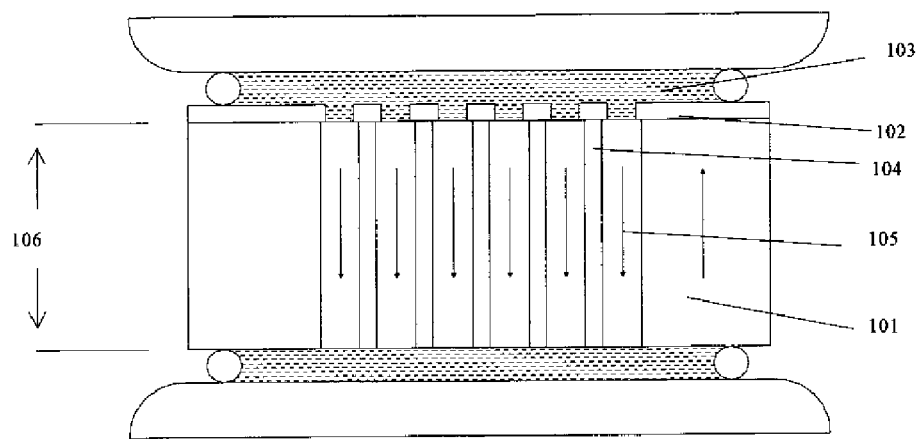
FIG. 1. illustrates a prior art domain grating device.

In one embodiment, a frequency conversion device is provided. The improved domain inversion structure resulting from the new fabrication process is shown schematically in FIG. 2. The inverted domains 202 are tapered in size from one face of the crystal to the other, and may extend through the entire thickness of the crystal 206. Domain inverted devices in lithium niobate made by the prior art fabrication techniques have been unable to provide this combination of advantageous properties. A typical prior art device is shown in FIG. 1. Here, although the domain walls extend through the entire thickness 106 of the crystal 101, they are substantially parallel to the Z-axis and the dimensions of the inverted domains 105 are substantially constant through the material thickness. Whilst, in principle, this constant domain dimension could be seen as a good property since it allows the fabrication of high aspect ratio domains, and provides a uniform grating structure throughout the thickness of the crystal, it is also exceedingly difficult to fabricate the grating so that the domains have exactly the optimum dimensions.

Figure 3:
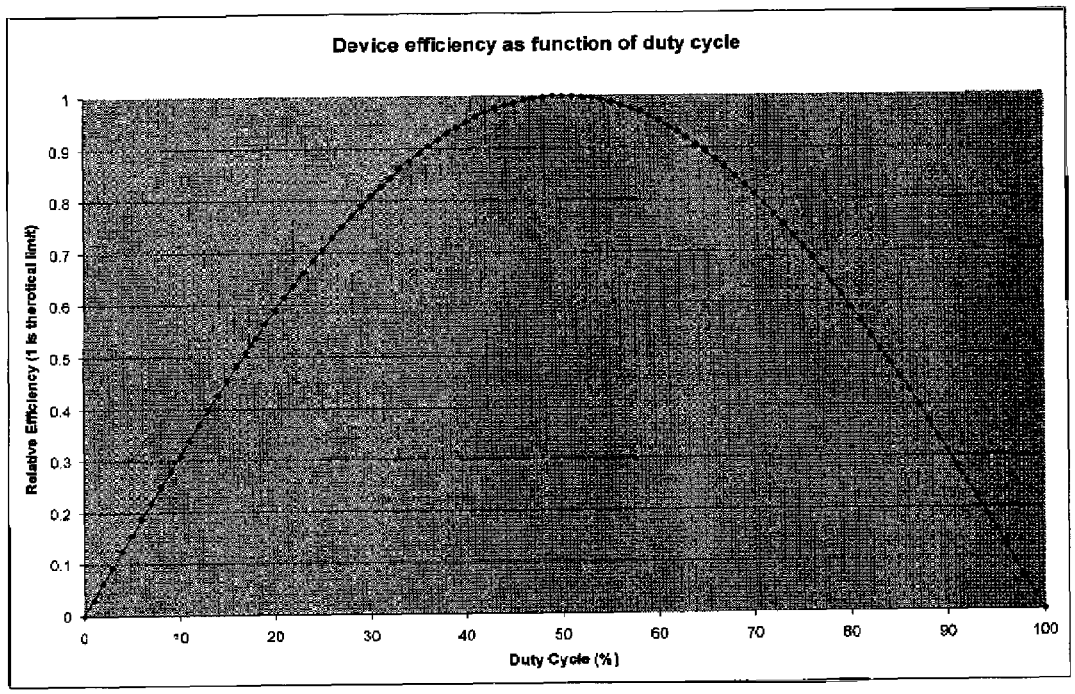
FIG. 3. illustrates a calculation of device conversion efficiency vs grating duty cycle.

In frequency conversion applications utilizing a first order QPM grating the optimum efficiency is achieved with a 50/50 duty cycle between the two anti-parallel domain orientations. The importance of the domain duty cycle can be seen in FIG. 3, where the efficiency of a phasematched interaction is plotted as a function of the duty cycle of the grating.

When the poling process is controlled by computer based on the amount of charge that has been transferred onto the crystal (a measure of the amount of domain inversion that has occurred), if there are a number of defects in the lithographically patterned poling mask that cause a number of domains to merge together, the charge involved in causing the merging will result in less domain inversion in the remaining pattern, potentially resulting in a lower than desired duty cycle overall. Since in undoped congruent lithium niobate the inverted domain is generally uniform in dimension throughout the bulk of the substrate, a domain grating that is either over or under duty cycle at the surface as a result of one of the above parameters will not provide optimum conversion efficiency. FIG. 1 depicts the conventional grating device 101 from prior art process described in R8. In this device, the domain grating is over duty cycle, i.e. the inverted domain 105 is larger than the un-inverted domain 104 in the grating region. Once the device is fabricated, the efficiency of the device is fixed and any difference in duty cycle from the optimum 50/50 results in a decrease in performance compared to the optimum device.

Figure 2:
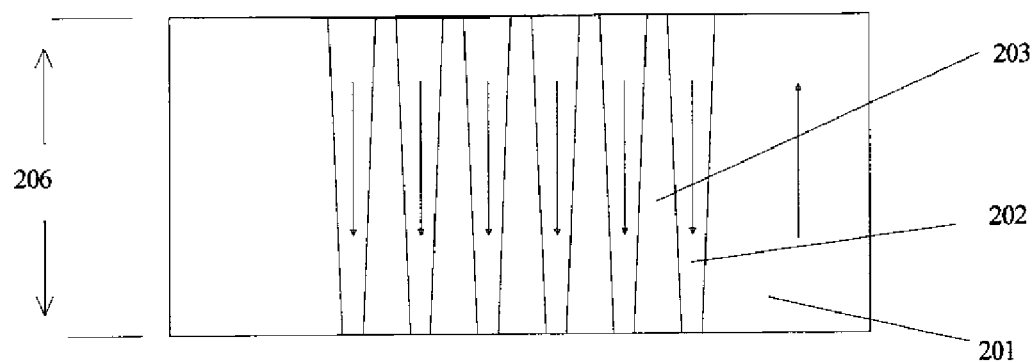
FIG. 2. illustrates one embodiment of a domain grating device with the tapered domain grating of the present invention.
Figure 4:
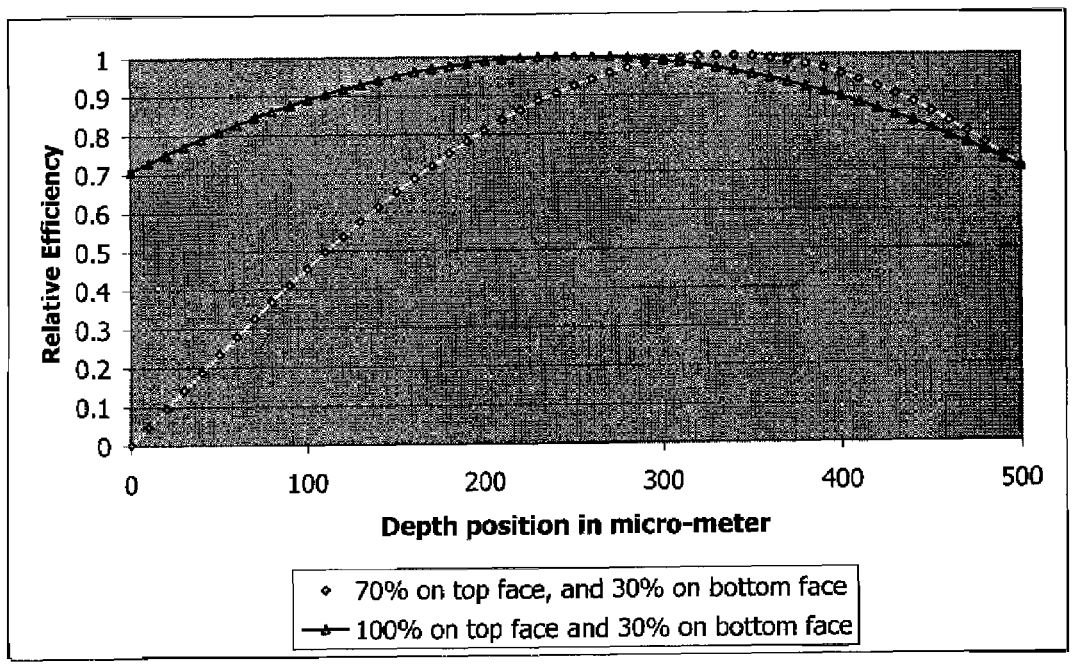
FIG. 4. illustrates a calculation of device conversion efficiency as a function of depth for one embodiment of the present invention.

In one embodiment of the present invention, a tapered domain grating device is provided where an ideal first order QPM 50/50 duty cycle is realized inside the crystal for efficient nonlinear interactions as shown schematically in FIG. 2. The inverted domains 202 are tapered in size from one face of the crystal to the other and may extend through the entire thickness of the crystal 206. Even if the domain inversion is not precisely controlled at the patterned surface, the taper of the domains in the present invention provides for a 50/50 duty cycle region within the bulk of the material where the dimensions of the inverted 202 and uninverted 203 domains are matched. For example, for a grating period of 4 µm, a substrate thickness of 0.5 mm, an inverted domain 202 dimension of 3 µm on the top (patterned) face and 1 µm on the bottom, there will be a 120 um thick region within the crystal where the duty cycle ranges from 47% to 53%, for which the efficiency is 98% of the theoretical maximum, as indicated in FIG. 4. Even when a more strongly tapered domain merges on the front face, FIG. 4 illustrates that as long as the domain is under duty cycle on the back face (less than 50/50), there still a region inside the material where the 50/50 duty cycle is found. Thus, an advantage of the improved domain inversion structure of the present invention is that even if the duty cycle of the domain inversion structure is not precisely controlled to be 50/50 at the patterned surface, the taper of the domains provides for a 50/50 duty cycle region within the bulk of the material where the dimensions of the inverted 202 and uninverted 203 domains are matched.

Figure 5:
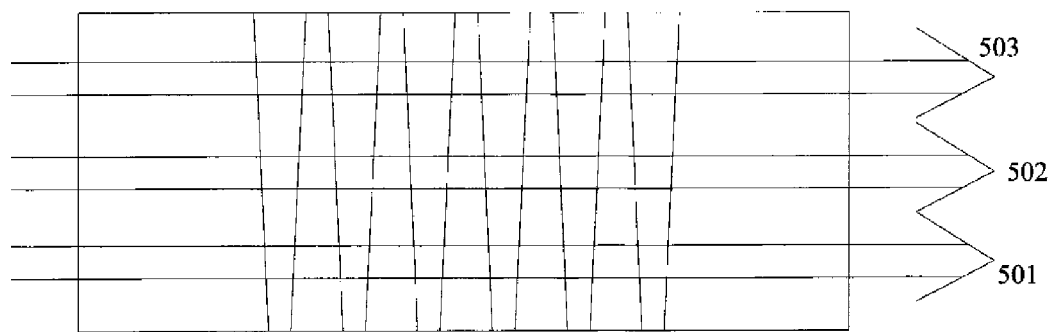
FIG. 5 illustrates an optical beam position for optimum performance for one embodiment of a domain grating device of the present invention.

When the device of FIG. 2 is used as a frequency conversion element, adjustment of the optical beam position with respect to the depth of the crystal will result in an optimally high efficiency nonlinear interaction as indicated in FIG. 5, wherein the beam 502 is at the position having the optimum efficiency. This post-fabrication efficiency optimization is not possible for devices produced from prior art processes with vertical domain walls. Since the exact duty cycle of the domain grating on the masked face of the device of FIG. 2 is not critical as long as it is greater than 50/50 and the domain taper angle is controlled such that the duty cycle on the unmasked face is less than 50/50, the degree of control required over the poling process is relaxed compared to that required to fabricate an exact 50/50 duty cycle grating with vertical walls. Thus, the tapered domain structure greatly increases the poling process latitude in terms of exact current and charge control in a mass production process, while preserving the ability to provide optimum device efficiency. The trade-off in this case is that the optimum duty cycle region of the crystal is necessarily limited by the domain taper angle. Therefore the uniformity of the device of FIG. 2 in the vertical direction through the crystal substrate will generally be worse than that of the device of FIG. 1 with vertical domain walls, but the peak conversion efficiency will generally be higher.

Highly efficient domain gratings can be achieved utilizing this device structure, for example an effective nonlinear coefficient of greater than 16 pm/V has been achieved for blue frequency doubling with a grating period of 4.45 um.

In one embodiment of the present invention, fabrication methods are provided that involve the generation of mobile charges within the substrate that is to be poled, accompanied by the application of a patterned high voltage electric field. This combination results in a patterned current flow through the substrate and creates a patterned domain inversion structure within the substrate. Various combinations of charge generation, voltage application and patterning mask can be used to tailor the size and shape of the domain inverted regions.

Figure 6:
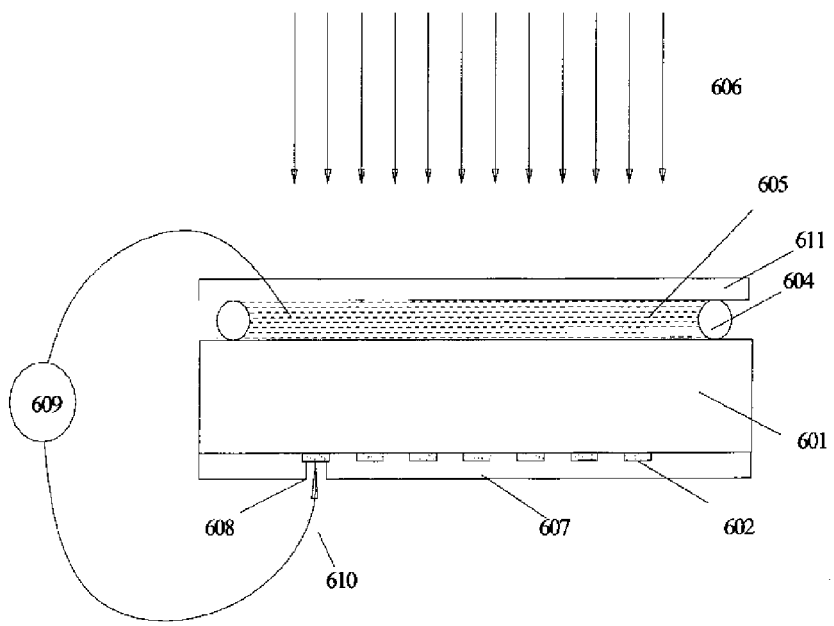
FIG. 6. illustrates an electrode configuration with uniform illumination through the back face for one embodiment of the present invention.

One basic approach of the invention is shown in FIG. 6 and combines a voltage applied between a patterned electrode 602 on one face of the substrate and a uniform transparent electrode 605 on the other and a transversely spatially uniform light illumination 606 incident to the said substrate through the said transparent electrode. The transversely spatially uniform light illumination creates photo-induced charges within the bulk of the substrate with a density and distribution dependent on the illumination intensity, illumination wavelength(s) and the absorption of the crystal substrate. The applied high voltage electric field causes a photo-current to flow through the substrate due to the presence of the photo-excited charges.

The patterned nature of the electric field, or in other terms, the patterned nature of the photocurrent flow on one face of the crystal substrate, and the mobile charge profile in depth resulting from the material absorption define the pattern of the resulting domain inverted features. The patterned electrode in FIG. 6 is depicted as a patterned metal layer 602, but it may also take the form of a patterned insulating layer overlaid with a conductor such as a metal or a liquid. In this case, the patterned insulating layer preferably acts as a current mask to pattern the flow of the photocurrent in response to the illumination and the applied field. It may also provide a modulation of the electric field strength within the crystal substrate. The mobile charges which are generated in the bulk of the material by the spatially uniform illumination and form the photocurrent in response to the applied electric field are constrained to flow through the patterned mask apertures, creating a large current density at the apertures which provides a strong effect in lowering the coercive field and enabling the controlled seeding of patterned domain inversion. The present inventors have observed that the effective coercive field of the crystal substrate is generally decreased as the magnitude of the photocurrent is increased, for instance by increasing the intensity of the illumination, or by altering the spectrum of the illumination.

Here, transversely spatially uniform light illumination means that the incident illumination is substantially uniform in intensity and spectrum across the transverse dimensions of the illuminated portion of the substrate surface, which is generally equivalent to the poling area. This uniformity is highly desirable in order to achieve a uniform spatial domain inversion pattern over the entire poling area. It should be noted that the illumination will not be uniform in the direction of the light propagation in the bulk of the material since absorption will decrease the intensity and change the spectral mix of the illumination as the light propagates into the material. The transverse uniformity of the domain inversion pattern should be maintained as long as the properties of the bulk substrate are uniform over the transverse dimensions of the illuminated region. The phrase "uniform illumination" should be taken to refer to illumination which is substantially uniform over the transverse dimensions of the illuminated region. It should also be noted that the spatially uniform light illumination does not have to be spatially uniform at all times. That is, the time averaged intensity and/or spectral content over a time period considerably shorter than the total illumination time should be substantially uniform, but the instantaneous intensity may vary across the illumination area. The requirement for illumination uniformity is based on a requirement for substantially uniform mobile charge generation across the illuminated region so that the electric field poling process is initiated at substantially the same point in time across the entire aperture, and is able to proceed at substantially the same rate over the illuminated area. In the presence of a material non-uniformity, such as a dopant concentration nonuniformity, the illumination uniformity can be tailored to result in uniform mobile charge generation in the substrate, that is, the illumination intensity can be varied transversely across the substrate such that even in the presence of the dopant concentration non-uniformity, the mobile charge generation remains substantially uniform and the resulting domain inversion pattern is also uniform. The applied electric field should also preferably be substantially uniformly applied across the illuminated area in order to provide uniform domain inversion, i.e. there should be no significant monotonic field variation across the transverse dimension of the substrate, although localized modulation of the electric field is desired for optimum poling. In the case of the material non-uniformity described above, the strength of the applied electric field could be varied across the transverse dimensions of the poling area instead of the illumination uniformity, in order to counteract the material uniformity. Alternatively, both the electric field and the illumination may vary across the poling area in such a way that their combination produces a uniform poling pattern, with or without the presence of a material non-uniformity.

The distributed nature of the photo-charges within the material and the patterned photo-current flow effectively define the domain inversion pattern throughout the bulk of the crystal substrate, leading to very high aspect ratio domain inversion features and very high quality short period domain inversion gratings. The current masking windows in the patterned electrode on one of the surfaces of the substrate, and the higher conductivity of the seeded domain walls growing in the bulk of the substrate enable a patterned current flow through the bulk of the crystal due to the photo-excited charges. These "patterned" moving charges can be envisioned as a virtual electrode in the bulk of the substrate.

Controlling the combination of applied voltage, illumination intensity, illumination wavelength(s), illumination time, photocurrent/charge and poling charge, enables control to be exercised over the size and shape of the resulting domain inverted features. It has been shown by the present inventors that with the appropriate illumination and voltage parameters (as described in the following preferred embodiments) it is possible to create a uniform short period (<4 micron) domain inversion grating in even 1 mm thick MgO:CLN crystal substrates. The domain inverted features can propagate through the entire thickness of the substrate and can be observed by HF etching on both the front and back faces of the substrate. Thus, domains with aspect ratios of greater than 250:1 can be fabricated uniformly over large areas limited only by the uniformity of the optical illumination, electric field application, and the uniformity of the substrate material itself.

Highly efficient frequency conversion devices can be fabricated using the new fabrication process described here. For example an effective nonlinear coefficient of greater than 16 pm/V has been achieved for blue frequency doubling with a grating period of 4.45 um.

In one embodiment of the present invention, the combination of patterned electric field and uniform illumination minimizes merging and provides improved uniformity and repeatability of domain inversion as compared to a patterned electric field alone. In addition, the peak high voltage that must be applied in conjunction with the uniform illumination is significantly lower that that required for uniform domain seeding at short periods without illumination, which substantially eliminates the possibility of destructive electrical breakdown of the crystal substrate during poling. This is especially important when considering scaling the electric field poling process to full wafer areas, and enables a far more robust process for high yield, high volume manufacturing that that of the application of a high voltage alone.

It has also been determined by the present inventors that the illuminated poling process of the present invention is more resistive to the deleterious effects of thermally induced domain inversion defects. These thermally induced domain inversion defects, often called "heat defects", result from the lithographic processing of Z-cut lithium niobate wafers. The heating and cooling cycles during the lithography process lead to the build up of pyroelectrically generated charges on the wafer surface, which can lead to the spontaneous domain inversion of small defect-seeded regions. Thus, a wafer that was uni-domain at the start of the lithographic process may end up with a large number of small, isolated domain inverted regions within it by the end of the process. During the electric field poling process these domains cause merging of the desired pattern and tend to grow to the detriment of the desired domain pattern, leading to reduced domain inversion pattern quality. The present illuminated poling invention has been found to resist the effects of these heat defects and suppress the tendency for the formation of large merged regions around each defect site during the poling process. Thus the desired domain inversion pattern can still be uniformly seeded and grown with good pattern quality, even when the poled area is increased to allow for wafer scale processing for high volume manufacturing.

It should be noted that others have attempted to use the formation of such "heat defects" as a method of seeding the domain inversion process in MgO:CLN to create uniform domain inversion gratings (Nakamura et al, "*Periodic poling of magnesium oxide doped lithium niobate*", Jnl. Appl, Phys, Vol 91, No 7, 2002, p 4528-34). However, the random nature of the "heat defect" locations makes this impractical for short period gratings. and with the application of a high voltage pulse alone, the preferential expansion of the "heat defects" during the poling pulse causes significant merging and loss of quality in the domain grating.

The size and shape of the inverted domain feature can be controlled by setting appropriate values for the illumination and voltage applied to the substrate. In particular it has been found that varying the illumination spectrum can be used to control the degree of penetration of the inverted domain into and through the crystal substrate for given set of poling parameters. With the appropriate illumination spectrum, which contains some optical power at wavelengths below about 320 nm, it is possible to terminate the domains before the illuminated face (the unpatterned face) of the crystal substrate. If the very short wavelength light is removed from the illumination spectrum, using an absorption filter for example, full penetration of the domains through the substrate can be readily achieved. Even with the very short wavelengths removed from the spectrum, it is still possible to terminate the domains within the bulk of the substrate by decreasing the illumination time and/or the illumination intensity compared to the values used to produce a fully penetrated domain inversion pattern.

In another embodiment of the present invention, domain inversion of 0.5 mm thick ~5% MgO doped congruent lithium niobate is achieved using a patterned metal electrode on one face and a transparent planar electrode on the other, combined with UV/visible illumination through the transparent electrode. As shown in FIG. 6, a patterned metal electrode 602 is disposed on a first face (generally termed the "front" face) of the crystal substrate 601, preferably the +z face, using standard photolithographic techniques as follows. Firstly the wafer surface is chemically cleaned using BOE, acetone and IPA in sequence. An oxygen plasma ashing process is used to ensure the removal of any remaining hydrocarbon contamination. A metal layer, for example tantalum, is deposited on the cleaned crystal surface using a sputter or e-beam deposition process. Care is taken to choose the suitable metal to use on the suitable surface of a given ferroelectric material. A layer of photoresist, e.g. Shipley 3312 or AZ 5214 is spun onto the metal layer and soft-baked to remove the excess solvent. The photoresist is exposed using standard lithographic techniques (contact or projection lithography) and developed into the pattern of the desired electrode. The metal is than etched either using wet chemical etching or plasma etching to form the patterned electrode 602. Alternatively the metal electrode fabrication can be performed using a lift-off process where the photoresist is patterned on the substrate first, and then metal is then deposited using e.g. an e-beam deposition technique. The metal that is deposited over the top of the resist is removed (or "lifted off") using solvent typically with ultrasonic agitation, while the metal deposited on the substrate surface remains. After the metal electrode is patterned, an insulating dielectric layer 607 is preferably deposited to cover the metal electrode. This dielectric layer should have good electrical insulating properties especially at the contact interface between the dielectric layer and the substrate surface. While the patterned metal lines provide the electric field modulation and the photo-current paths, the insulating layer between the lines provides a current masking capability to limit the photo-current to flow only to the metal lines. A photoresist layer e.g. Shiply 3312 or AZ 4210, can serve as the insulating layer after it is cross linked (hard baked) at a suitable temperature, e.g. 140-200° C. depending on the type of resist. Alternatively an $SiO_2$ layer deposited by sputtering, evaporation or spin-on-glass can form the insulator. Electrical contact holes 608 to the metal electrode through the insulating layer are also provided by well known lithography processes.

With regard to the photolithographically patterned mask used to define the domain inversion pattern, it has been found by the present inventors that a long line feature is not suitable for poling of short grating periods due to the fact that domain structure tends to follow the hexagonal crystal structure, where one of the sides of the hexagon is oriented along the y-axis of the crystal in LiNbO3. When the line feature in the poling mask is defined at an angle with respect to the y-axis, the resulting poled domain generally either displays a jagged edge or expands outwards from the mask feature to form an elongated hexagonal domain, as illustrated in FIG. 7.

The domain expands sideways away from the patterned mask feature 705 until the edges of the domain 706 are aligned with the crystal y-axis 704. Thus, the width of the domain is no longer defined by the width of the photolithographically defined mask, but rather it is defined by the effective width 702 of the lithographic feature perpendicular to the y-axis. Hence, the greater the angle 703 of the feature with respect to the y-axis, the greater the width the poled domain becomes before the sides of the domain are parallel to the y-axis.

For optimal poling quality of fine pitch gratings the poling mask should be aligned so that the grating bars are exactly parallel to the y-axis. However, there are a number of difficulties involved in this alignment. Firstly, there is typically a tolerance of ±0.25 to ±0.5 degrees in the angular accuracy of the orientation flat provided by the wafer manufacturer. Secondly, the beveling process applied to the edges of the wafer to remove edge chips and prevent wafer breakage during processing often leads to a slight curvature of the orientation flat, further reducing the effective accuracy. Thirdly, some angular error will be introduced when the poling mask is physically aligned to the orientation flat due to the resolution of the mask aligner and the finite length of the orientation flat at the edge of the wafer.

It can be seen from the domain expansion argument above that for a given period of grating 712 in FIG. 7*b*. there is a maximum allowable misalignment angle 710 for a particular length of feature 714. Basically, when the effective width 711 of the feature perpendicular to the y-axis becomes equal to or greater than half the grating period 712, there is a significantly increased likelihood that adjacent domains will merge together and the grating structure will be lost.

Thus, for a robust production domain inversion process we can define a maximum line length in the poling mask, such that the achievable angular alignment accuracy does not cause the domain grating pattern to merge. For example, if the alignment accuracy is ±0.5 degrees and the grating period is 4 µm, the maximum feature length that can be allowed is L=2 µm/sin(0.5 degrees)=~230 µm. In this case, a number of line features are patterned on the mask separated by a small distance, to make up the full width of the desired poling region.

In the case of the patterned metal poling mask used in this embodiment of the invention, the mask features can effectively be broken into bars of the desired length simply by depositing and patterning an insulating layer on the surface of the crystal substrate before the deposition and patterning of the metal mask layer. The patterned insulating layer should consist of a series of lines disposed substantially perpendicular to the desired grating bars, and spaced apart by the desired bar length. The metal layer may then be deposited over the top of the insulator and then patterned to provide the grating lines. Where the patterned insulator is interposed between the metal layer and the crystal substrate the required voltage to achieve domain inversion will be increased, effectively preventing domain inversion from occurring, and hence breaking the patterned metal poling mask into a number of bars of the desired length. In other embodiments of this invention a patterned insulating layer is used to provide the poling mask. In this case the poling bars are defined simply by the length of the openings in the photomask that are transferred into the insulating mask and no extra processing is required.

To improve the angular alignment accuracy it is possible to provide domain inverted alignment features which more precisely define the crystal y-axis direction. An initial poling pattern consisting of a few narrow bars parallel to the y-axis is aligned to the wafer orientation flat. The pattern is then poled into the crystal and the domains allowed to expand out from the mask pattern so that their edges are parallel to the y-axis. The poling mask may then be removed and the crystal surface etched in HF to reveal the poled features. (Preferably, only the area immediately surrounding the poled features is exposed to the HF to avoid possible damage of the surface still to be poled.) A second poling mask consisting of the desired grating pattern is then aligned using the poled features to define the crystal y-axis, thus achieving improved accuracy between the grating lines and the crystal axis. This two step process should allow longer individual lines to be poled than are generally possible with single step alignment to the wafer orientation flat.

During the lithography process, there are many thermal processes such as resist baking. It is preferable to control the thermal ramp rates of the crystal substrate/wafer during these baking processes, and also preferable to provide some form of discharge path for the pyrolectrically generated charges. MgO:CLN is very prone to the generation of "heat defects", regions of domain inversion created as a result of pyroelectric charge accumulation on the wafer surface during heating and cooling cycles. In general the "heat defect" domain inversion sites are problematical for the fabrication of high quality short period domain inversion gratings since they tend to lead to merges between adjacent domains and defects, reducing the quality of the grating and the efficiency of any QPM optical frequency conversion process using the grating.

Despite the observation that the illuminated electric field poling process of the present invention is significantly more tolerant of, or resistant to, the deleterious effects of "heat defects" than the prior art electric field poling process, it is still preferable to minimize the number of defects that are formed in order to maximize the quality of the final domain inversion grating.

In the poling process, the electrical contact to the metal electrode may be made by a probe contact 610. A transparent electrode 605 on the back face is created by, for example, a solution of lithium chloride in de-ionized water. The liquid can be confined using an 'o' ring 604 with a quartz cover plate 611, or simple a tape cut out or silicone gel or grease barrier.

A typical experimental setup for the poling is shown in the FIG. 8. A computer 805 controls a high voltage pulsed power supply 806 and a UV/visible light source 804. The electrical contacts 808 to the crystal 801 are connected to the high voltage power supply, and a light sensor 807 is preferably incorporated into the circuit to provide an optical monitor for the computer control. Preferably, the PC controls the voltage supply, the light source shutter and the timing sequence. Alternatively some features such as the illumination time may be controlled by independent timers and the optical monitor used to provide process sequencing via the PC. The computer can also preferably monitor the current in the poling circuit, using for example an optically isolated current monitor 809, to provide control of the charge delivered in the various phases of the process.

The light output from the light source (in this instance coupled via a light-pipe) 803 is arranged to provide sufficient illumination intensity and uniformity across the electrical contact area. Typical intensities of ~10 W/cm$^2$ at the output of the light-pipe (broadband, all wavelengths from a high pressure mercury bulb) are used. A beam shaping/expanding system 802 can be used to increase the illumination beam diameter and/or uniformity on the substrate. Typically about 0.5 W/cm$^2$ of total light intensity is incident at the surface the substrate. Higher and lower intensities may be used with the appropriate adjustments in illumination time and applied voltage to achieve domain inversion.

Figure 9:
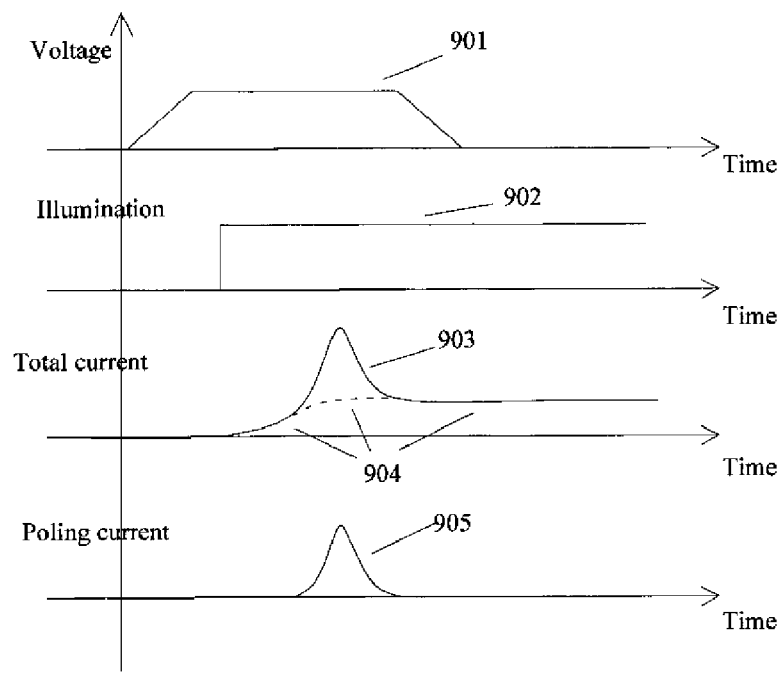
FIG. 9. illustrates characteristic electrical traces for a single pulse Illuminated poling process for one embodiment of the present invention.

A typical sequence of voltage and UV light poling is shown in FIG. 9. as follows: an initial voltage of about 2500V (~5000V/mm) 901 is applied to the substrate in the absence of illumination, ramping up from zero volts in about 60 ms. At this time no poling occurs because the voltage is significantly below the coercive field required to achieve domain inversion, and therefore no current flows in the poling circuit. The shutter of the illumination source is then opened, illuminating the unpatterned face of the wafer with both visible and ultra violet wavelengths 902 (a simple broadband mercury lamp source is used in this example. It is also possible to use a combination of one or more narrowband light sources to achieve the same effect, as long as the wavelength(s) and intensity(ies) are chosen so as to produce a similar quantity and distribution of photo-excited charges within the crystal substrate.) After the illumination begins a photo-induced current 904 starts to flow through the substrate under the influence of the high voltage applied across it. This current generally increases gradually over a time frame of 100ths to 10ths of seconds, and then tends to reach a plateau. Once the photo-current has increased to a sufficient value, which is determined largely by the area of exposure and the applied voltage, domain inversion occurs within the crystal substrate despite the applied electric-field being nominally below the coercive field. This domain inversion appears to be seeded from the patterned face and is thought to result at least in part from the effects of the concentration of the photo-induced current flow in the small features of metal electrode. It is thought that domain inversion occurs even though the applied voltage is significantly below the nominal coercive field of the material at least in part because the mobile charges generated in the substrate by the illumination decrease the effective coercive field of the illuminated material.

The observed current flow 903 is now composed of two components, the photocurrent 904 due to the charges generated by the illumination, and the poling current 905, the displacement current due to the domain inversion. Typically the photocurrent remains substantially constant after its initial growth period, whereas the poling current 905 typically increases to a maximum and then decreases again as the poling is completed. Thus the poling process can be controlled by monitoring the current flow and terminating the applied voltage 901 when either the current 903 or transferred charge reaches some predetermined value (which is also dependent on the magnitude of the photo-current).

After poling, the insulating layer over the metal electrode is stripped off and the metal electrode is etched off. The substrate is then etched in hydro-fluoric acid (HF) to reveal the poled pattern. It has been found that in general the inverted domains resulting from the above described process are tapered, with a wider line width on the patterned electrode face, and a narrower width on the face with the transparent uniform electrode. The width on the patterned face and depth into the substrate both generally increase with increasing voltage, increasing illumination intensity and increasing illumination time.

It has been observed with some combinations of illumination spectrum, illumination dose (i.e. light intensity×time) and applied voltage, that the inverted domains are terminated inside the bulk of the crystal and do not generally reach the uniformly illuminated face. It has been found that the inclusion of short wavelength UV radiation around or below the band gap (~320 nm in MgO:CLN) in the illumination spectrum has the effect of terminating the domains in the bulk of the crystal.

In general it can be desirable that the domains penetrate completely through the crystal substrate for optimum device performance and for ease of device characterization, so it is preferable to filter the illumination to remove the shortest wavelengths. A dichroic or absorptive filter may be used to provide selectivity in the wavelengths that are removed.

After etching of the top and bottom faces of the crystal to reveal the domain inversion patterns, the quality of the domain inversion grating device can be estimated using FIG. 4. The wafer substrate containing the domain inversion gratings may be diced to separate the individual gratings, which may have different periods corresponding to different patterns on the photolithographic mask. The end faces of each device may then be optically polished and, preferably, coating with anti-reflection coatings, ready for use as a quasi-phase-matched frequency conversion device as shown in FIG. 5. The position of the optical beam within the crystal can be adjusted in depth to utilize the optimum 50/50 duty cycle region of the grating which results from the tapered domain structure.

After poling, different portions of the crystal have opposite domain orientations. There is a resulting crystal discontinuity at the boundary between the opposite polarity domains. At this boundary, a refractive index pattern can be observed using transmission illumination and crossed polarizers, or a Nomarski microscope. This refractive index pattern may be the result of the uncompensated charges at the boundary, causing a refractive index change via the electro-optic effect, or from stress at the boundary via the elasto-optic effect. This refractive index pattern becomes less pronounced after the sample is exposed to UV or short wavelength visible illumination, thermal annealing or simply left at room temperature for some extended period of time.

In order to effectively use the periodically poled (domain inverted) frequency conversion device for the generation of visible light, the discontinuity of the crystal at the domain wall boundary needs to be addressed carefully. The boundary and the associated refractive index change can act as an extra scattering source, increasing the optical loss in the device. In addition, new phenomena such as green induced IR absorption (GRIIRA) and Blue induced IR absorption (BLIIRA) are associated with this boundary structure, and the defects introduced by the domain boundary.

In one embodiment of the present invention, to alleviate the effects of the boundary defect structure on the visible light generation process, a high temperature annealing process is used. A discharging closed loop is formed by placing the domain inverted sample between two semi-conductive silicon wafers which are electrically connected to dissipate pyroelectric charges. The sample stack is then placed into a high temperature oven or furnace, typically in an ambient air atmosphere, although alternative oxidizing and reducing atmospheres of, for instance, oxygen and argon respectively may be preferred for some applications. The temperature of the furnace is raised slowly from room temperature up to typically between 500 C and 600 C in about 5 hours. The samples are left at this temperature for a relatively long period, typically around 48 hours, before being cooled down to room temperature. Preferably the cooling is performed at a slow rate of a few degrees centigrade per minute, preferably as low as 0.5 C/min. The electrically shorted high temperature annealing process significantly improves the performance of the visible frequency conversion device, especially for short wavelengths in the blue spectrum, by reducing the boundary defect density, uncompensated bonds and charges, and stresses at the domain boundaries. For short period frequency conversion devices for visible applications care must be taken not to significantly reduce the material, i.e. to use an atmosphere containing at least some oxygen. It is also necessary to maintain the annealing temperature below the threshold which causes domain boundary motion and domain merging. In MgO:CLN, this domain boundary motion is typically observed in short period domain inversion structures at temperatures in excess of about 650 C, indicating that annealing temperatures are preferably below this value.

As noted above, the exposure of the domain inverted sample to UV and visible radiation appears to reduce the magnitude of the refractive index change at the domain wall boundary. Therefore, it may be advantageous to illuminate the domain inverted sample with UV and or visible light during the high temperature annealing process. In this instance, transparent conducting material is preferably used for the discharging loop, e.g. Indium Tin Oxide (ITO) coated quartz, to enable simultaneous illumination and pyroelectric charge dissipation.

In another embodiment of the present invention, the domain inverted device is partially coated with a conductive layer. Preferably this layer provides a conductive path linking the front and back opposing surfaces of the domain inverted device. The conducting layer may be deposited before or after annealing and dicing of the domain inverted device. If the layer is deposited before dicing, the conductive path may be completed after dicing by for instance painting the side face of the device with conductive silver paint which spills slightly over onto the front and back faces. The conducting layer enables the dissipation of thermally excited charges—pyroelectricity, and also enables the dissipation of photocharges that drift to the edge of the crystal, where they are no longer trapped. Thus, the condcuctive path over parts of at least three faces of the domain inverted device offers the prospect of decreasing the beam distortion and performance limiting effects of any residual photorefractivity still present in the domain inverted device.

In a previous embodiment of the present invention, the domain structure is fabricated in MgO:CLN by using a simple single applied voltage combined with illumination, as described above, generally has a significant taper from front (patterned electrode face) to back (uniform illumination and electrode face) surfaces. The domain features on the uniform illumination/electrode (back) face are generally very narrow. Thus, the optimum conversion efficiency region, illustrated in FIG. 4 is relatively narrow due to the strong domain taper.

In another embodiment of the present invention, the taper of the domain is controlled in order to increase the dimension of the domain on the back face whilst maintaining good domain quality on the front face and increasing the size of the optimum conversion efficiency region. This can be achieved by applying a voltage pulse or series of pulses to the crystal after the illumination is removed.

The substrate can be prepared as shown in FIG. 6. and as described in the previous preferred embodiment. For the poling process, the electrical contact to the metal electrode is made by probe contacts 610. A transparent electrode 605 on the back face is created by, for example, a solution of lithium chloride in de-ionized water. The liquid can be confined using an 'o' ring 604 with a quartz cover plate 611, or simple a tape cut out or silicone gel or grease barrier.

A typical experimental setup for the poling is shown in FIG. 8. A computer 805 controls a high voltage pulsed power supply 806 and the UV/visible light source 804. The electrical contacts 808 to the crystal 801 are connected to the high voltage power supply, and a current sensor 809 is preferably incorporated into the circuit. Preferably the poling system is controlled by a PC which can capture the voltage, current and charge flow data in real time, allowing different voltages to be sequenced or triggered or shut down based on time, current flow, or charge transfer values, or any combination of these. Again preferably a photodiode or optical monitor 807 is incorporated into the poling fixture in order to monitor the illumination source so that the computer control program can also sequence the required illumination exposure. Preferably, the PC controls the voltage supply, light source shutter and timing sequence. Alternatively some features such as the illumination time may be controlled by independent timers and the optical monitor used to provide process sequencing via the PC.

The light output from the light source (in this instance coupled via a light-pipe) 803 is arranged to provide sufficient illumination intensity and uniformity across the electrical contact area. Typical intensities of ~10 W/cm$^2$ at the output of the light pipe (broadband, all wavelengths from a high pressure mercury bulb) are used. A beam shaping/expanding system 802 can be used to increase the illumination beam diameter and/or uniformity on the substrate. Typically about 0.5 W/cm$^2$ of total light intensity is incident at the surface the substrate. Higher and lower intensities may be used with the appropriate adjustments in illumination time and applied voltage to achieve domain inversion.

Figure 10:
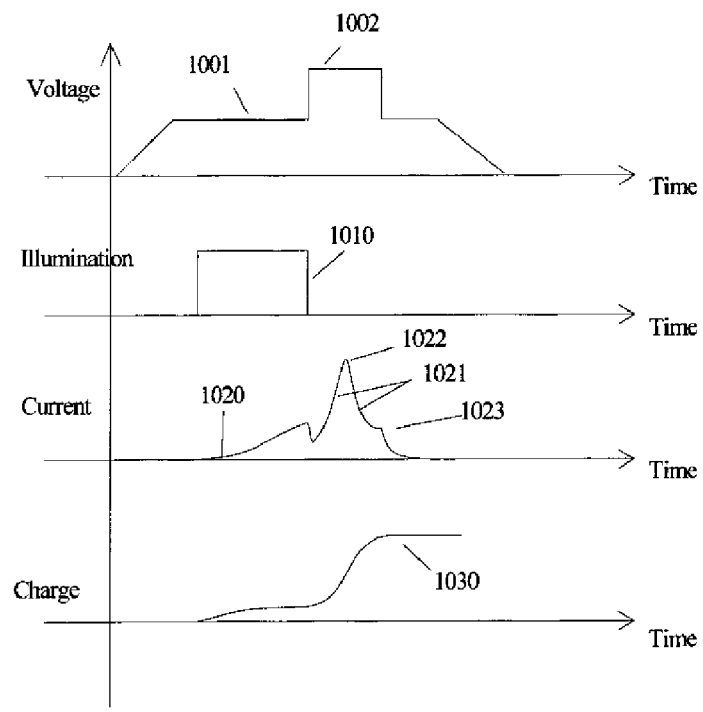
FIG. 10. illustrates characteristic electrical traces for a dual pulse Illuminated poling process for one embodiment of the present invention.

A typical sequence of voltage and UV light poling is shown in FIG. 10. An initial voltage of about 2000V (~4000V/mm) 1001 is applied to the substrate in the absence of illumination, ramping up from zero volts in about 60 ms. At this time no poling occurs because the voltage is significantly below the coercive field required to achieve domain inversion, and therefore no current flows in the poling circuit. The shutter of the illumination source is then opened, illuminating the unpatterned face of the sample with both visible and ultra violet wavelengths 1010 (a simple broadband mercury lamp source is used in this example. It is also possible to use a combination of one or more narrowband light sources to achieve the same effect, as long as the wavelength(s) and intensity(ies) are chosen so as to produce a similar quantity and distribution of photo-excited charges within the crystal substrate.) After the illumination begins a photo-induced current 1020 starts to flow through the substrate under the influence of the high voltage applied across it. This current generally increases gradually over a time frame of 100ths to 10ths of seconds, and then tends to reach a plateau. Once the photo-current has increased to a sufficient value, which is determined largely by the area of exposure and the applied voltage, domain inversion can occur within the crystal substrate despite the applied electric-field being nominally below the coercive field. This domain inversion appears to be seeded from the patterned face and is thought to result at least in part from the effects of the concentration of the photo-induced current flow in the small features of the patterned metal electrode. It is thought that domain inversion occurs even though the applied voltage is significantly below the nominal coercive field of the material at least in part because the mobile charges generated in the substrate by the illumination decrease the effective coercive field of the illuminated material.

The function of this first illuminated voltage pulse is to seed or initiate the domain inversion, so the illumination is terminated before the poling is complete. This termination can be based on an empirically determined time or a charge flow monitored by the computer, at which point the light source shutter is closed and the illumination is blocked. Typical values for this first pulse are a duration of ~0.5 to 1 sec, and a charge flow of 0.02 to 0.12 mC/cm$^2$ at a voltage of ~2000V (4000V/mm) and an illumination intensity of ~0.5 W/cm$^2$.

Once the initiation of the domain inversion in the illuminated voltage pulse is performed, the illumination light is shut off, and, using the optical monitor 807 for sequencing control, the computer applies the second voltage pulse 1002. Preferably, this post illumination voltage is higher in magnitude than that used during the illumination pulse, since there are no photo-excited charges being generated to decrease the coercive field of the material. Typically a voltage of around 3-4000V (6-8000V per mm) may be applied post illumination. In this un-illuminated voltage pulse, the poling current 1021 typically increases to a well defined peak 1022, and then decreases to a plateau value 1023. The decrease of the poling current is related to the completion of the domain inversion. If the voltage is removed while the current is at the peak, the poling pattern will typically be under duty cycle and some domain features will be incomplete. If the voltage is maintained until the poling current has decreased to its plateau value the domain pattern will typically be complete, with a duty cycle on the front (patterned) face of the crystal that is dependent on the parameters of the illumination and illumination voltage pulse. Maintaining the voltage for a significant length of time after the current has decreased to its plateau value typically leads to over duty cycle domains and a larger number of merges within the domain inversion pattern. The post-illumination voltage pulse may be controlled using the computer control program based on either the charge flow 1030 within the circuit or the value and gradient of the poling current 1021 or on a combination of both. Thus poling may be terminated when a particular charge has been transferred, when the current has fallen to a particular value, when the rate of decrease of the current reaches a certain value or any combination of these (and other) parameters.

After electric field poling, the insulating layer over the metal electrode is stripped off and the metal electrode is etched off. The substrate may then be etched in HF to reveal the poled pattern. The inverted domains are generally observed on the back face of the substrate. Tailoring of the dose of illumination, the voltage applied when the illumination is applied, the post-illumination voltage and pulse duration, etc, can be used to adjust the duty cycle of the domain grating and the taper angle of the domain from front surface to the back surface.

After etching of the top and bottom faces of the crystal to reveal the domain inversion patterns, the quality of the domain inversion grating device can be estimated using FIG. 4. The wafer substrate containing the domain inversion gratings may be diced to separate the individual gratings, which may have different periods corresponding to different patterns on the photolithographic mask. The end faces of each device may then be optically polished and, preferably, coating with anti-reflection coatings, ready for use as a quasi-phase-matched frequency conversion device as shown in FIG. 5. The position of the optical beam within the crystal can be adjusted in depth to utilize the optimum 50/50 duty cycle region of the grating which results from the tapered domain structure. In this embodiment, the domain taper angle is reduced compared to that of the process of the second embodiment. This means that there is less dimension variation in the domains from the top face to the bottom face of the crystal. This results in a wider optimal efficiency region within the crystal (i.e. a greater depth range over which the duty cycle is within some percentage of 50/50), but requires more control to be exercised over the dimension of the domain on the top face to ensure that the 50/50 duty cycle region is centrally located within the crystal.

Optimization of the domain grating quality, duty cycle and taper does not have to be limited to the simple sequence of one illuminated voltage pulse followed by a second higher voltage pulse. Any sequence of illuminated and un-illuminated voltage pulses may be used in any order to provide the required poling charge to realize the desired domain inversion pattern in the substrate independent of the presence of any photo-current due to the illumination.

Voltage pulses can be simultaneous with illumination pulses, voltage pulses can precede or follow illumination pulses, voltage pulses can be longer or shorter than illumination pulses. Time delays may be applied between the termination of one illumination or voltage pulse and the application of the next. In addition, different illumination spectra (light wavelengths) may be used in different illumination pulses with any combination of different applied voltages.

The metal electrode may also be patterned on the −z face, depending on the type of substrate. In general, adjustments of the pulse parameters (such as the direction of the applied illumination, and the magnitude and sequence of the illumination and applied voltages) compared to those used for a +z face patterned crystal will be required to achieve optimal domain inversion patterns.

Because different wavelengths are absorbed in the material at different depths, it is possible to use a time-varying illumination wavelength to produce a variation with time in the depth at which charges are generated within the crystal. In particular, a rotating circular filter where different cut off wavelengths are coated along the circular path may be used to change the illumination wavelength with time during the voltage pulse. A suitable profile of illumination wavelength versus time, and therefore of charge generation depth, will help guide the domain growth through the bulk of the crystal from the patterned face to the un-patterned face.

Alternatively, a series of fixed wavelength filters may be stepped across the illumination beam in turn to alter the wavelength spectrum incident on the crystal substrate. Preferably, the time taken to introduce or remove the filter from the beam should be short in comparison to the total illumination time so that the transition of the edge of the filter across the beam does not affect the illumination uniformity significantly.

Figure 11:
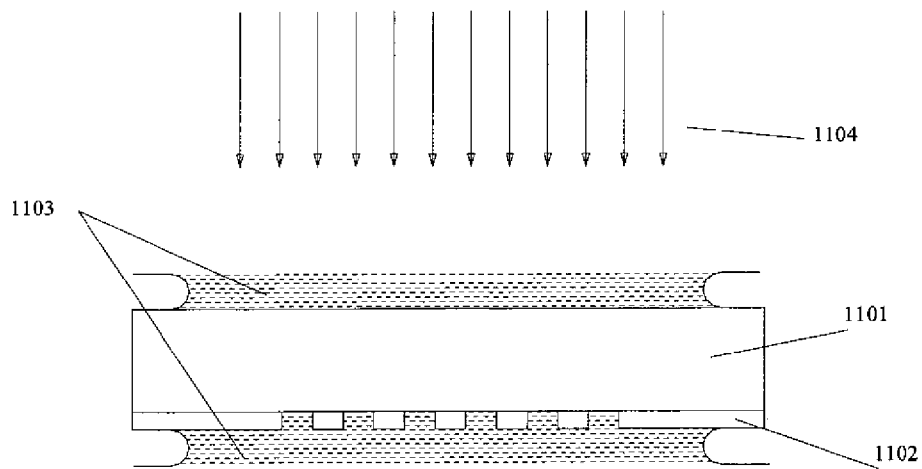
FIG. 11. illustrates an insulating mask electrode configuration with illumination through the back face for one embodiment of the present invention.

In another embodiment of the present invention, a dielectric current mask with a liquid contact electrode is used. As shown in FIG. 11 for periodic domain inversion in 0.5 mm thick ~5% MgO doped congruent lithium niobate 1101, a patterned insulating mask 1102 may be used as described in R8, and R9. Preferably the mask is applied to the −Z face of the said crystal (although the +Z face can also be used) and consists of a layer of photoresist some 2-4 microns thick (e.g. Shiply 3312 or AZ 4210). After spinning onto a clean MgO: CLN wafer and softbaking (~90 C, 30 minutes) the photoresist is exposed using standard photolithographic techniques (contact or projection lithography) and developed to produce the pattern desired for the domain inversion grating. After ensuring the removal of all photo resist residue from the pattern openings the resist layer 1102 is hardbaked, preferably at a temperature of around 120° C. or higher. The hard bake temperature is chosen as a trade-off between crosslinking of the photoresist and slumping or distortion of the photoresist pattern during the bake process, which is undesirable for the subsequent electric field poling process. It should be noted that different bake times and temperatures will be applicable to different resist formulations and thicknesses and different patterns, and should generally be chosen to provide a robust and substantially electrically insulating layer on the surface of the crystal wafer.

Electrical contact to the crystal surface during the poling process is made using a conductive liquid, e.g. a solution of lithium chloride in de-ionized water. The liquid conductor 1103 is preferably applied to the patterned face first and may be confined to the desired contact area using an o-ring and a quartz cover plate or a simple tape cut-out. Restricting the contact area of the liquid is preferable in order to ensure the uniformity of the poling process. UV/visible illumination 1104 is incident from the unpatterned (back) face of the crystal substrate. The dimensions of the poling area where the liquid contact is made should preferably match or be less than the dimensions of the area that can be uniformly illuminated by the available light source. If the contact is applied over regions that are not uniformly illuminated, the resulting domain inversion pattern will generally be nonuniform. It should be noted that the electrical contact areas on the front and back faces of the crystal do not have to be the same size. For instance, if electrical contact is made to the entire front face of the crystal at once, the poling area may be defined to a smaller area by confining the liquid electrode on the back face, and preferably the illuminated area, to a small subset of the crystal surface, for instance using a UV-opaque dicing tape to confine the liquid conductor and cover the remaining portions of the back face of the crystal. Electrical contact between the external circuit and the liquid conductor of the front face of the crystal may be made by placing the crystal front-face-down onto a metal contact plate. Connection to the uniform liquid electrode on the back aface of the crystal may be made with one or more probe wires, positioned to allow uniform distribution of voltage and current to the poling area while not obstructing the illumination of the crystal substrate.

It is important to ensure that good electrical contact is made to the crystal surface by the liquid electrolyte/conductor. This may be achieved by adding a small amount of a surfactant to the liquid to reduce the surface tension, allowing it to more readily wet the small features in the photoresist pattern on the front face. Alternatively the photoresist pattern may be overcoated with a conductor, e.g. by sputtering a metal or carbon conductive layer, so that electrical contact is maintained from the top of the mask down to the crystal surface without the need for the liquid conductor to completely fill each feature in the pattern.

A typical experimental setup for the poling is shown in the FIG. 8. A computer 805 controls a high voltage pulsed power supply 806 and the UV/visible light source 804. The electrical contacts 808 to the crystal 801 are connected to a high voltage power supply, and a current sensor 809 is preferably incorporated into the circuit. Preferably the complete poling system is controlled by a PC which can capture the voltage, current and charge flow data in real time, allowing different voltages to be sequenced or triggered or shut down at different times, current flows, or charge transfer values, or any combination of these. Again preferably a photodiode or optical monitor 807 is incorporated into the poling fixture in order to monitor the illumination source so that the computer control program can also sequence the required illumination exposure. Preferably, the PC controls the voltage supply, light source shutter and timing sequence. Alternatively some features such as the illumination time may be controlled by independent timers and the optical monitor used to provide process sequencing via the PC.

The light output from the light source (in this instance coupled via a light-pipe) 803 is arranged to provide sufficient illumination intensity and uniformity across the electrical contact area. Typical intensities of ~10 W/cm$^2$ at the output of the light pipe (broadband, all wavelengths from a high pressure mercury bulb) are used. A beam shaping/expanding system 802 can be used to increase the illumination beam diameter and/or uniformity on the substrate. Typically about 0.5 W/cm2 of total light intensity is incident at the surface the substrate. Higher and lower intensities may be used with the appropriate adjustments in illumination time and applied voltage to achieve domain inversion.

A typical pulse sequence is as follows: An initial voltage of about 2000 V (~4000 V/mm) 1001 is applied to the substrate in the absence of illumination. At this time no poling occurs because the voltage is significantly below the coercive field required to achieve domain inversion, and therefore no current flows in the poling circuit. The shutter of the illumination source is then opened, illumination the unpatterned face of the wafer with both visible and ultra violet wavelengths 1010 (a simple broadband mercury lamp source is used in this example. It is also possible to use a combination of one or more narrowband light sources to achieve the same effect, as long as the wavelength(s) and intensity(ies) are chosen so as to produce a similar quantity and distribution of photo-excited charges within the crystal substrate.) After the illumination begins a photo-induced current 1020 starts to flow through the substrate in response to the high voltage applied across it. This current generally increases gradually over a time frame of 100ths to 10ths of seconds, and then tends to reach a plateau. Once the photo-current has increased to a sufficient value, which is determined largely by the area of exposure and the applied voltage, domain inversion occurs within the crystal substrate despite the applied voltage being nominally below the coercive field.

The function of this first illuminated voltage pulse is to seed or initiate the domain inversion, so the illumination is terminated before the poling is complete. In general the domains resulting from this illuminated voltage pulse are tapered, and their width on the patterned face and depth into the substrate both generally increase with increasing voltage, increasing illumination intensity and increasing illumination time. This termination can be based on an empirically determined time or a charge flow monitored by the computer, at which point the light source shutter is closed and the illumination is blocked. Typical values for this first pulse are a duration of ~0.5 to 1 sec, and a charge flow of 0.02 to 0.12 mC/cm$^2$ at a voltage of ~2000 V (4000V/mm) and an illumination intensity of ~0.5 W/cm$^2$.

The domain shape and size may be further controlled and the quality of the domain inversion grating structure enhanced by applying a further voltage after the illumination is removed. Preferably, this post illumination voltage is higher in magnitude than that used during the illumination pulse, since there are no photoexcited charges being generated to decrease the effective coercive field of the material. Typically a voltage of around 3500V (7000V per mm) 1002 may be applied post illumination. During this un-illuminated voltage pulse, the poling current 1021 typically increases to a clearly defined peak 1022, and then decreases to a plateau value 1023. The decreasing poling current is related to the completion of the domain inversion. If the voltage is removed while the current is at the peak, the poling pattern will typically be under duty cycle and some domain features will be incomplete. If the voltage is maintained until the poling current has decreased to its plateau value the domain pattern will typically be complete, with a duty cycle that is dependent on the parameters of the illumination and illumination voltage pulse. Maintaining the voltage for a significant time after the current has decreased to its threshold value typically leads to over duty cycle domains and a larger number of merges within the domain inversion pattern. The post-illumination voltage pulse may be controlled using the computer control program based on either the charge flow 1030 within the circuit or the value and gradient of the poling current 1021 or on a combination of both. Thus poling may be terminated when a particular charge has been transferred, when the current has fallen to a particular value, when the rate of decrease of the current reaches a certain value or any combination of these (and other) parameters.

After poling, the insulating mask layer is stripped off of the crystal surface. The substrate may then be etched in HF to reveal the poled pattern. The inverted domains are generally observed on the back face of the substrate. Tailoring of the dose of illumination (illumination time and intensity), the voltage applied when the illumination is on, the post-illumination voltage and pulse duration, etc can be used to adjust the duty cycle of the domain grating and the taper angle of the domain from front surface to the back surface.

After etching of the top and bottom faces of the crystal to reveal the domain inversion patterns, the quality of the domain inversion grating device can be estimated using FIG. 4. The wafer substrate containing the domain inversion gratings may be diced to separate the individual gratings, which may have different periods corresponding to different patterns on the photolithographic mask. The end faces of each device may then be optically polished and, preferably, coating with anti-reflection coatings, ready for use as a quasi-phase-matched frequency conversion device as shown in FIG. 5. The position of the optical beam within the crystal can be adjusted in depth to utilize the optimum 50/50 duty cycle region of the grating which results from the tapered domain structure. In this embodiment, the domain taper angle is reduced compared to that of the process of the second embodiment. This means that there is less dimension variation in the domains from the top face to the bottom face of the crystal. This results in a wider optimal efficiency region within the crystal (i.e. a greater depth range over which the duty cycle is within some percentage of 50/50), but requires more control to be exercised over the dimension of the domain on the top face to ensure that the 50/50 duty cycle region is centrally located within the crystal.

Optimization of the domain grating quality, duty cycle and taper does not have to be limited to the simple sequence of one illuminated voltage pulse followed by a second higher voltage pulse. Any sequence of illuminated and un-illuminated voltage pulses may be used in any order to provide the required poling charge to realize the desired domain inversion pattern in the substrate independent of the presence of any photo-current due to the illumination.

Voltage pulses can be simultaneous with illumination pulses, voltage pulses can precede or follow illumination pulses, voltage pulses can be longer or shorter than illumination pulses. In addition, different illumination spectra (light wavelengths) may be used in different illumination pulses with any combination of different applied voltages.

The insulating mask may also be patterned on the +z face, depending on the type of substrate. In general, adjustments of the pulse parameters (such as the direction of the applied illumination, and the magnitude and sequence of the illumination and applied voltages) compared to those used for a −z face patterned crystal will be required to achieve optimal domain inversion patterns.

In another embodiment of the present invention, patterned current flow is generated by a combination of a patterned illumination and a patterned applied electric field. For instance, the substrate may be patterned with an electrically insulating and optically absorbing or reflecting masking material. This mask can simultaneously provide the dual roles of patterning the illumination and the applied electric field. The substrate is illuminated from the masked face, resulting in only the open areas in the mask pattern being illuminated and thus mobile charges being generated only in those areas of the substrate. Preferably the illumination wavelength(s) are chosen such that the penetration depth into the illuminated regions of the substrate is short, such that no substantial diffraction or interference pattern can result in the substrate which otherwise would allow charge generation in unwanted areas of the crystal. Simultaneously with the illumination, the electric field is patterned by the insulating mask such that the areas of the substrate in the open areas of the mask pattern are subjected to a high electric field, while the field in the areas covered by the mask is lower. The combination of patterned illumination and patterned electric field results in a patterned photocurrent flow in the material which provides enhanced seeding for domain inversion at the patterned face.

Figure 12:
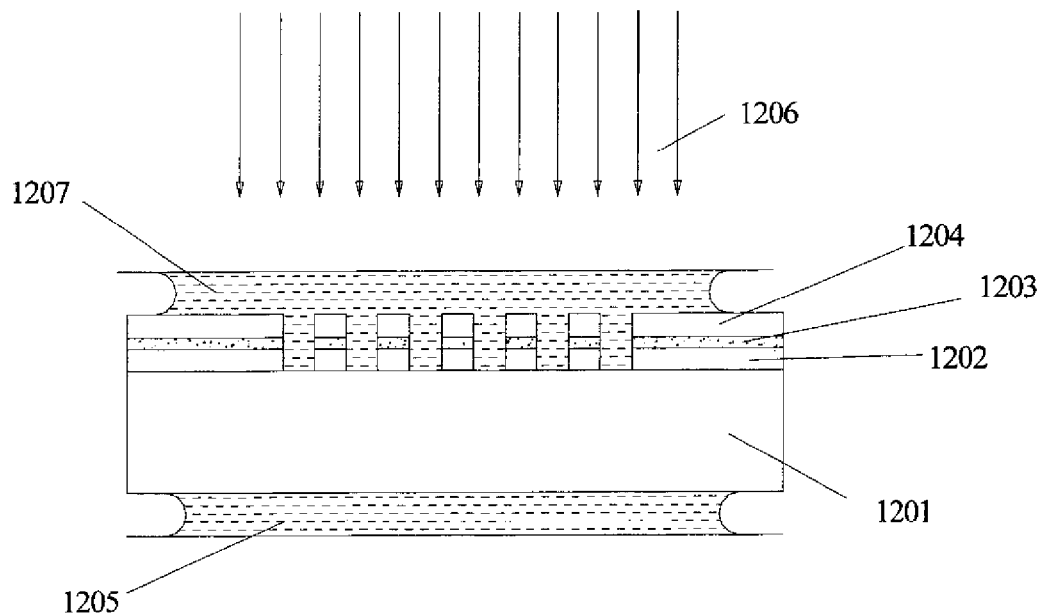
FIG. 12. illustrates an Insulating mask electrode configuration with UV illumination through the front face for one embodiment of the present invention.

FIG. 12. depicts an example of this preferred embodiment where a wafer 1201 of, for example, 0.5 mm thick z-cut 5% MgO doped congruent $LiNbO_3$ is used. Preferably, the patterned electrode is defined on the −z face of the crystal substrate. An insulating layer 1202 is deposited onto the −Z face of the substrate, for example a photoresist layer of ~2 μm thickness, or a spin-on-glass layer of ~1 μm thickness. The insulating layer is hard-baked to crosslink the material and provide robust physical and electrically insulating properties. Since an insulating layer like photoresist can absorb UV light and generate photo-induced charges, it is preferable to provide a metal over-layer 1203 that blocks the UV and visible light from reaching the photoresist mask. A metal layer such as Ti, NiCr, Al etc, preferably with a high absorption and or reflection in the UV and visible spectrum is deposited on the surface of the insulator, e.g. by evaporation or sputtering. A layer of photoresist 1204 is spun on the metal layer and standard photolithographic patterning processes are used to define the desired electrode pattern. The pattern may be transferred into the metal layer using a wet or dry etch, e.g. reactive ion etching or sputter etching. The underlying insulating layer of hard-baked resist or spin-on-glass is then patterned to provide openings to the crystal surface, preferably using a reactive ion etch process to create substantially vertical walls and to avoid damage or removal of the metal light blocking layer.

Electrical contact to the crystal surface during the poling process is easily made using LiCl solution. The liquid 1207 is preferably applied to the patterned face first and may be confined to the desired contact area using an o-ring or a simple tape cut-out. It is important to ensure that good electrical contact is made to the crystal surface by the liquid electrolyte/conductor. This may be achieved by adding a small amount of a surfactant to the liquid to reduce the surface tension, allowing it to more readily wet the small features in the photoresist pattern.

Electrical contact to the opposite face of the substrate (the unpatterned or back face) is made in a similar way with LiCl electrolyte 1205 or may be achieved with metallization of the back side of the wafer. The wafer is oriented with the patterned face facing the output of the UV/visible illumination source. Contact to the electrode on the unpatterned face may be made with a simple probe in the liquid contact or to the metal electrode, contact to the patterned front face may be made using a probe contact to the edge of the liquid so as not to block the illumination from entering the crystal substrate.

The poling sequence may be described as follows and as illustrated in FIG. 10. A voltage pulse 1001 of about 2000 volts (~4000 V/mm) is applied across the electrodes on the front 1207 and back 1205 surfaces of the crystal substrate. During this pulse, a UV light pulse 1010 is applied to the patterned front surface of the substrate. A photo-current 1020 starts to flow through the substrate due to the photo-induced charges created by the illumination which move in response to the applied external field. The illumination pulse is applied for about 0.3 s, then the UV light is shut off. The combination of illumination and applied voltage induces seeding of the domain inversion pattern, despite the applied voltage being considerably below the coercive field of the bulk crystal material. The seeding occurs only in the open areas of the mask on the −Z face where the applied field is high and the illumination reaches the surface of the crystal, thereby allowing a patterned photocurrent to flow in those confined regions. In general, at the end of the illumination pulse, the seeded domain inversion features are terminated within the bulk of the crystal and do not extend all the way to the unpatterned electrode on the back face of the crystal.

Once the light pulse is terminated, a second high voltage pulse 1002 is applied to the substrate to grow the domains through the substrate. Typically the voltage of the second pulse is around 3500V (7000V per mm. During this un-illuminated growth voltage pulse, the poling current 1021 generally increases to a clearly defined peak 1022, and then decreases to a plateau value 1023. The decreasing poling current is related to the completion of the domain inversion. If the voltage is removed while the current is at the peak 1022, the poling pattern will typically be under duty cycle and some domain features will be incomplete. If the voltage is maintained until the poling current has decreased to its plateau value 1023 the domain pattern will typically be complete, with a duty cycle that is dependent on the parameters of the illumination and illumination voltage pulse. The post-illumination voltage pulse may be controlled using the computer control program based on either the charge flow 1030 within the circuit or the value and slope of the poling current 1021 or on a combination of both.

The choice of wavelength in this embodiment is be dictated by the consideration that the light should be absorbed close to the surface of the material. The absorption is preferably strong so as to prevent significant diffraction or the creation of an interference pattern in the bulk of the material. In the absence of diffraction, the photo current will be well defined by the opening in the insulating mask layer and therefore the domain inversion seeding and subsequent growth will be similarly well defined, creating the desired domain inversion pattern. Preferably the absorption depth of the illumination is a few microns into the crystal substrate.

In another embodiment of the present invention, a single wavelength of UV or visible light is used as the illumination source, enabling an interference pattern to be created within the crystal substrate. The coherent light source may be a frequency doubled diode pumped solid state laser or gas laser such as an argon or krypton ion laser, or any other laser source operating in the UV/visible spectral region. Absorption of light at the constructive interference fringes within the crystal generates localized concentrations of photo-induced mobile charges. These charges form a photo-current in response to a voltage applied across the faces of the crystal substrate, and this photocurrent/voltage combination is used as previously described to seed domain inversion in a localized manner.

Figure 13:
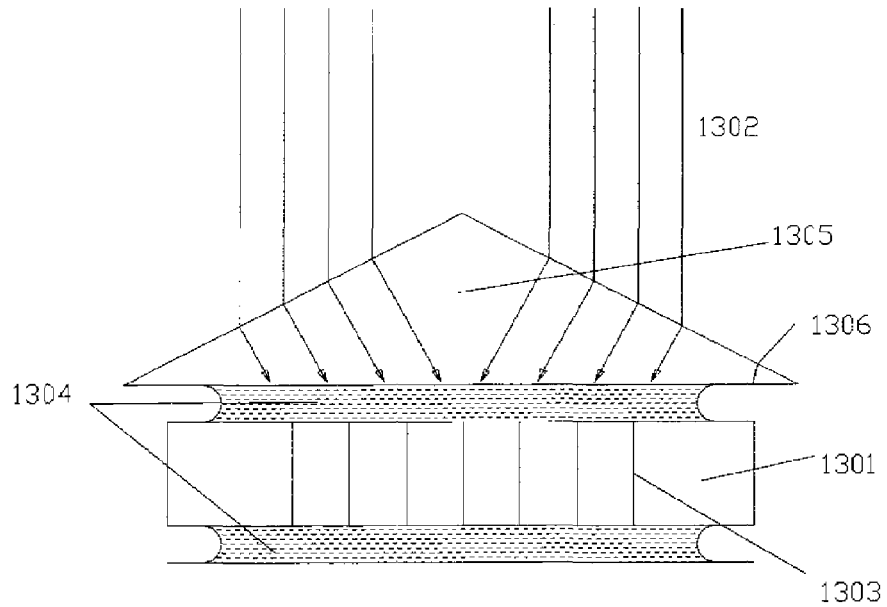
FIG. 13. illustrates interference UV pattern poling for one embodiment of the present invention.

In FIG. 13, an unpatterned MgO:CLN wafer 1301 of 0.5 mm thickness is illustrated. A prism 1305 is used to split an incoming light beam 1302, e.g. from a Krypton ion laser @ 413.1 nm, and create an interference pattern 1303 with the desired period within the crystal substrate. The angle of the prism 1306 for BK7 glass is designed to be 5.043 degree to generate 4.425 um grating period. It may be preferable to use LiNbO3 as prism material, and the angle for LiNbO3 will be 1.891 degrees. The incident angle of the input light beam to the prism must be well controlled, and the orientation of the wafer must be accurately set relative to the axes of the interference fringes such that the fringes lie substantially along the Y-axis of the crystal.

An optically transparent conducting liquid 1304 such as LiCl in water is used as the electrode and is introduced between the prism and the crystal surface, preferably forming a smooth, continuous layer with no bubbles or thickness variations that can affect the uniformity of the interference pattern. If desired, pressure can be applied to the prism to ensure that the liquid layer is thin and uniform. Alternatively, a transparent conductor such as ITO (indium tin oxide) may be deposited on the crystal surface or the surface of the prism to act as the electrode.

Electrical contact to the liquid electrode may be made at the edge of the prism. Typically a voltage of ~2000V (~4000 V/mm) is applied to the crystal while it is being illuminated, and the photocurrent flow through the substrate is monitored. Preferably, the value of the photocurrent is kept low so that the current flow is strongly localized to the narrow constructive interference regions of the interference pattern.

After allowing the photocurrent to flow for a period of time varying from seconds to minutes, depending on the magnitude of the applied voltage, the intensity of the illumination, the magnitude of the photocurrent and the poled area and material type of the substrate being poled, a higher voltage is applied to complete the domain inversion. It is preferable to block the illumination as the higher voltage is applied, to prevent a dramatic increase in photo-current flow. The higher, poling growth voltage is generally of the order of 3500-4000V and may be applied either as a step function or continuously ramped from the initial to final values. A current sensor may be used to monitor the charge flow during the poling pulse, and accounting for the photocurrent flow, the poling pulse may be terminated when the sufficient charge has been transferred to achieve the desired amount of poling.

When choosing an illumination wavelength for this embodiment it is necessary to consider the dual requirements of a reasonably strong absorption to generate the necessary photo-induced charges while simultaneously allowing the interference fringes to extend to a substantial depth into the crystal. Therefore the illumination wavelength is preferably in the long wavelength UV to short wavelength visible range around approximately 400 nm, considerably above the band edge of ~320 nm. As the optical absorption will lead to a gradient in photo-charge density with depth into the substrate, there may be a preferential illumination direction, e.g. it may be preferable to illuminate the crystal through the +Z face.

In the above described process the inverted domains are seeded in the narrow illuminated regions of constructive interference in the optical interference pattern. However, in the arrangement of FIG. 13 there is no mechanism to prevent the domains from growing laterally, to form the energetically favorable hexagonal domain shape, other than the preferential seeding and poling due to the localized photo-current and illumination. In practice the domain confinement provided by the localized photo-current and illumination is not sufficient to prevent the domains from expanding laterally and merging together at short periods.

Figure 14:
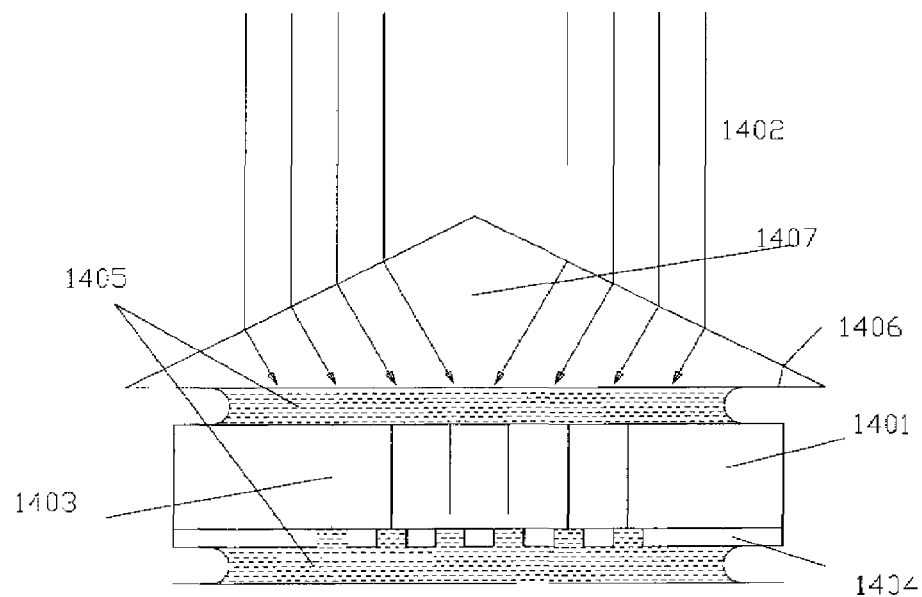
FIG. 14. illustrates the combination of a UV interference pattern with an insulating mask layer for poling in one embodiment of the present invention.

An improvement to this embodiment is illustrated in FIG. 14, where a patterned insulating mask layer 1404 is provided on the opposite face of the crystal to the illuminating beam 1402. The period of the pattern in the insulating mask is the same as that of the interference pattern within the crystal substrate, and the mask is preferably aligned such that the domain inversion features run substantially parallel to the Y-axis of the crystal. The substrate 1404 is mounted on a rotation and translation stage (not shown) so that alignment can be achieved between the patterned mask layer and the optical interference pattern. The substrate is illuminated from the unpatterned face to create an optical interference pattern. A lens is placed adjacent to the patterned face of the substrate to collect the light that is transmitted through the crystal and transfer it to a photodetector. When the constructive interference fringes of the interference pattern are aligned with the openings in the insulating mask in both rotational and translation directions, the observed transmitted light signal will reach a maximum. Once alignment is achieved, it may be preferable to block the coherent light to remove the interference pattern and allow the photo-generated charges created during the alignment procedure to dissipate.

With the insulating mask and interference pattern aligned, a similar poling sequence to that described above for the unpatterned sample can be performed. With the illumination source incident on the crystal, a voltage is applied to the liquid electrodes 1405 on the patterned face and unpatterned face, resulting in a photo-current flow which is now confined by both the constructive interference regions and the openings in the insulating mask aligned to the interference pattern. The extra current confinement effect of the insulating mask combines with a modulated electric field to improve the definition of the domain pattern and prevent unwanted lateral expansion of the domains.

The patterned insulating mask layer also provides a further benefit for the short period domain inversion process. As discussed earlier with reference to FIG. 7. there is a maximum length of poling feature which is preferable for a given period due to lateral domain expansion as a result of angular misalignment between the domain feature and the crystal axes. In the present embodiment, the optical interference pattern is composed of fringes which are continuous across the entire illuminated area. Thus, any slight misalignment will cause lateral expansion based on the full width of the poled area, easily causing merging of short period gratings. However, the patterned insulating mask layer enables the continuous fringes to be effectively broken into shorter lengths by adding an insulating barrier to block domain inversion at certain points along the length of the fringe.

Thus, the length of the domain features can be photolithographically reduced to the ≦230 μm length preferable for a 4 μm period grating, or ≦180 μm for a 3 μm period grating, based on an angular misalignment tolerance of ~0.5 degrees between the grating and the crystal axes.

Figure 15:
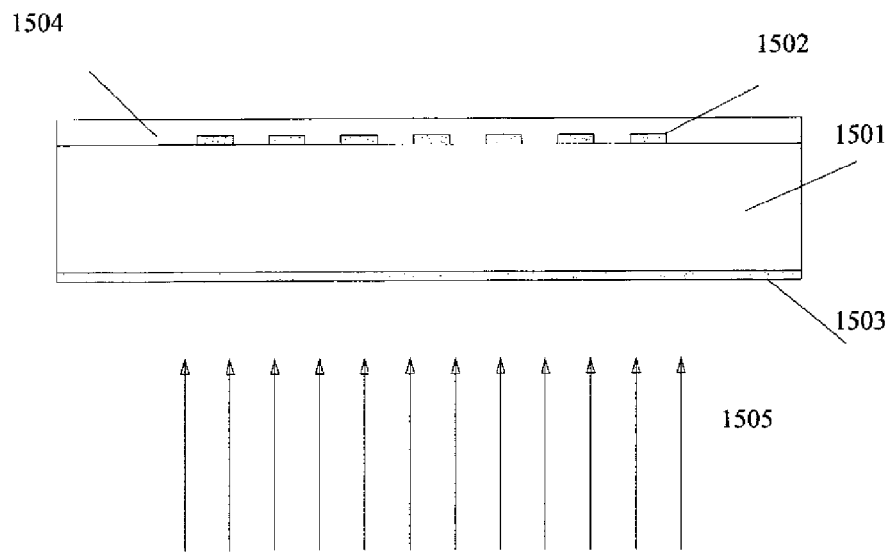
FIG. 15. illustrates E-beam induced poling for one embodiment of the present invention.

Another embodiment of the invention is shown in FIG. 15. An alternative approach to generating the mobile charges of the present invention is to use a high energy electron beam to inject the charges into the substrate. The combination of the uniform electron beam irradiation through the back face of the crystal with the patterned metal or insulating mask on the front face results in patterned current flow at the patterned mask surface and through the depth of the substrate, resulting in patterned domain inversion. This greatly simplifies the equipment requirements compared to the prior art focused electron-beam approach to domain inversion.

When using a high energy electron beam for domain inversion according to the present invention, the energy of the electron beam can be varied in time from high to low or low to high to vary the penetration depth of the electrons into the substrate. This capability in principle provides advantages over the illuminated embodiments of the present invention since the electron beam energy and penetration depth can be more flexibly and tightly controlled than the absorption of light, which is limited by the available wavelength spectrum and the absorption spectrum of the material.

An external voltage may be applied to the substrate in a similar manner to the illuminated embodiments, and may be applied before, during and after the electron bombardment. It should be noted that when the high energy electrons are stopped inside the crystal, the kinetic energy of the electrons will be absorbed and increase the temperature of the substrate, which may decrease the coercive field for the domain inversion process.

FIG. 15 illustrates a substrate 1501, preferably 0.5 mm thick MgO:CLN, with a patterned metal electrode 1502 disposed using standard photolithographic deposition and patterning techniques on the +Z face of the substrate. Alternatively a patterned insulating mask may be used. A thin metal electrode 1503, e.g. ~1000 Å of titanium, is deposited on the −Z, or back, face of the substrate. A high energy electron beam system (not shown) e.g. a system from HVEA Inc, is used to generate an electron beam 1505 which is incident on the unpatterned −Z face of the crystal substrate. The electron energy and dose are controlled by the accelerating voltage and current flow of the electron beam system respectively.

The electron beam is collimated to provide uniform exposure over a defined area, preferably over the entire wafer surface. For electric field poling, the electron beam is incident through the unpatterned −Z face while the patterned +Z face is grounded. The electric field generated by the accumulated electrons within the substrate is generally sufficient to cause domain inversion to occur. An external voltage may be applied between the patterned electrode 1502 and the unpatterned electrode 1503 to control the flow of mobile-charge-current through the substrate and improve the domain inversion pattern definition and quality.

The improved domain inversion structure of the present invention is of particular value when used to construct a frequency converter for the application of second harmonic generation for the creation of visible laser light sources. This application has proven very challenging for prior art devices due to the difficulty in fabricating the very short grating periods required, ~4 μm to 6 μm, with high quality and uniformity, and due to the performance degradations due to photorefractivity and green and blue induced infra-red absorption (GRIIRA and BLIIRA). The present invention provides a fabrication process for high quality, high uniformity and high efficiency quasi-phasematched frequency converters with periods as short as 4 μm in a photorefractively robust material, MgO:CLN The present invention also provides a high temperature annealing process coupled with a closed loop discharge path which enables the effects of BLIIRA and GRIIRA to be significantly reduced. In addition, the present invention provides an optimized frequency conversion device with a tapered domain structure which ensures that at least some portion of the bulk crystal has an optimum 50/50 duty cycle domain grating.

In one embodiment of the present invention, an efficient visible frequency conversion element and device is provided for the generation of visible light using an improved domain inversion structure. Such a device is shown schematically in FIG. 16, indicating a single pass frequency doubled laser system. The pump laser 1602 is coupled into the frequency converter 1601 using a set of coupling optics 1604, e.g. a focusing or collimating lens. The input face of the frequency converter is preferably anti-reflection (AR) coated at the fundamental wavelength so as to minimize efficiency losses in the optical conversion process, while the output face is preferably AR coated for at least the second harmonic wavelength and preferably for the fundamental wavelength as well. The pump laser 1602 may be a semiconductor diode laser, a diode pumped solid state laser, e.g. Nd:YAG or Nd:YVO$_4$, a gas laser, or any other type of laser with coherent output light 1603 of fundamental frequency which matches the conversion wavelength of the frequency converter 1601. Preferably, for efficient frequency conversion, the spectral bandwidth of the laser pump source is less than or comparable to the phase-matching bandwidth of the frequency converter. The polarization of the pump beam is preferably arranged to be parallel to the crystal Z-axis to enable the highest nonlinear coefficient, d$_{33}$ to be used for the frequency conversion interaction.

The temperature of the frequency converter 1601 is generally adjusted using a heated mount 1605 so as to match the operating wavelength of the converter with the input fundamental pump laser wavelength. Alternatively, the wavelength of the pump laser may be tuned using a grating or an etalon so that it matches the acceptance wavelength of the frequency converter. An advantage of the MgO:CLN devices enabled by the present invention is that the operating temperature is much lower than that required for CLN devices, <100° C. vs. ≧220° C. The position of the pump beam 1603 within the frequency converter 1601 should be adjusted for maximum conversion efficiency to make use of the 50/50 duty cycle of the domain grating which is ensured by the tapered domain structure. An optical filter 1606 may be located in the output beam to remove the residual pump beam and transmit the second harmonic output at visible or UV wavelengths.

In the second harmonic generation application described here, the required period of the domain inversion grating in the frequency converter is determined by the wavelengths of the interacting beams as follows:

$$\Lambda = \frac{\lambda_{pump}}{2(n_{sh} - n_{pump})}$$

where Λ is the grating period, $\lambda_{pump}$ is the pump wavelength, $n_{sh}$ is the refractive index at the second harmonica wavelength and $n_p$ is the refractive index at the pump wavelength.

A knowledge of the refractive index dispersion and thermo-optic coefficients of the nonlinear optical crystal enables a domain inversion grating to be designed to quasi-phasematch a second harmonic interaction at a particular wavelength and at a particular temperature.

Figure 16:
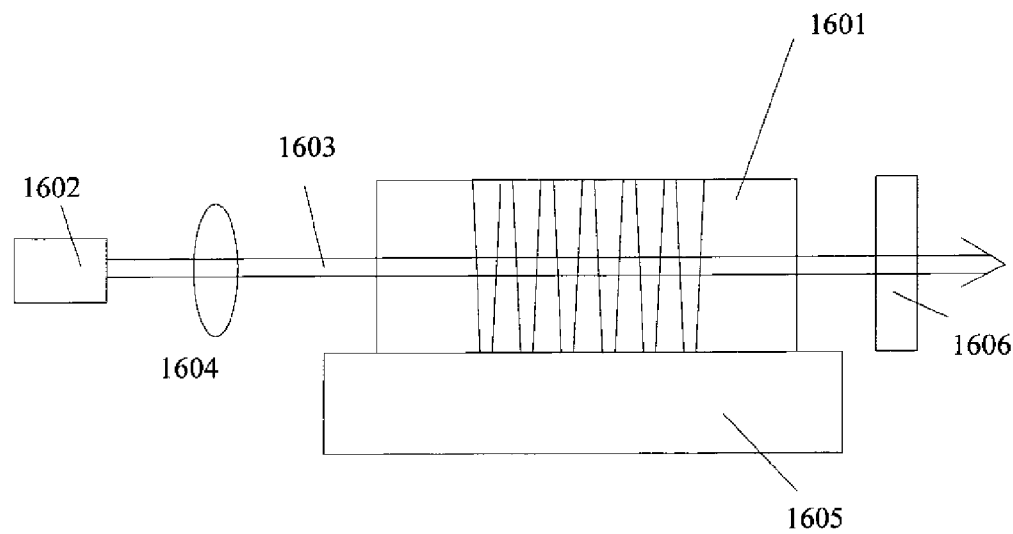
FIG. 16. illustrates a single pass frequency doubled visible laser source using a domain grating device for one embodiment of the present invention.

The frequency conversion device of FIG. 16 finds applications in medical instrumentation, semiconductor metrology and laser display devices.

Figure 17:
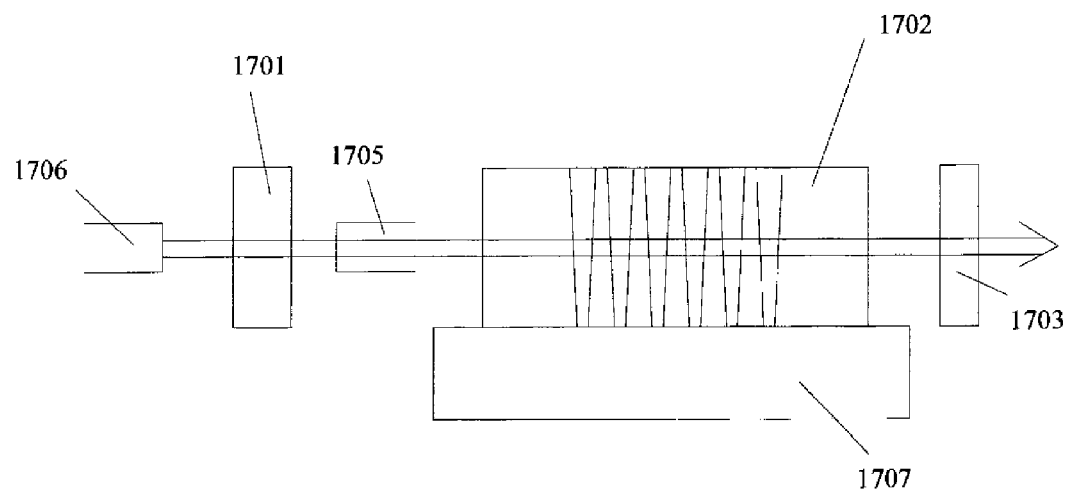
FIG. 17. illustrates an Intra-cavity frequency doubled visible laser source using a domain grating device for one embodiment of the present invention.

An alternative application for the frequency conversion device of the present invention to yield efficient second harmonic generation is intra-cavity frequency conversion as shown in FIG. 17. Placing the frequency converter 1702 inside the pump laser cavity makes use of the higher circulating power within the cavity compared to the CW or pulsed output from the same laser, significantly increasing the efficiency of the second harmonic generation interaction, which is proportional to the square of the power in the pump beam. The laser gain medium 1701 may be an electrically pumped semiconductor laser, an optically pumped semiconductor, or an optically pumped crystal gain medium such as Nd:YAG. One face of the gain medium 1701 is high reflection coated at the fundamental pump wavelength, and the other is anti reflection coated for the fundamental. Preferably this face is high reflection coated at the second harmonic wavelength to prevent the second harmonic visible light from damaging the semiconductor pump source. The domain inverted frequency converter 1702 is placed adjacent to the gain medium 1701. Optionally, there may be coupling optics such as a focusing or collimating lens (not shown) disposed between the gain medium and the frequency converter. Both input and output faces of the frequency converter are anti-reflection coated for both the fundamental and second harmonic wavelengths. A second mirror 1703 is placed on the opposite side of the frequency converter to the pump laser to form the resonant laser cavity. This mirror may be a simple multilayer dielectric reflector or it may be a distributed reflector such as a volume Bragg grating. Alternatively the output face of the frequency converter may be optically coated to form the cavity output mirror. Temperature control of the nonlinear optical frequency converter using a heated mount 1707 may be used to tune the crystal to peak efficiency for the operating wavelength of the laser. Alternatively, the wavelength of the pump laser may be tuned using a grating or an etalon so that it matches the acceptance wavelength of the frequency converter. Typically the frequency conversion crystal is designed according to the relation described above so that it must be held at a slightly elevated temperature to provide optimum conversion efficiency for the design wavelength of the laser. This is for two main reasons, firstly the slightly elevated temperature, typically 40-90° C. helps to reduce the possibility of residual photorefraction distorting the optical beam and reducing the efficiency, and secondly maintaining the elevated temperature requires only a simple heater, which is generally less complicated, failure prone and more efficient than the thermo-electric cooler that would be required to provide a stable operating temperature nearer room temperature. In addition, in consumer electronic products, the ambient operating temperature is not well controlled, so it is important to design the device to operate at a temperature higher than that which will be experienced as an ambient temperature, so that heating is always required and a stable operating temperature can be maintained.

For a crystal gain medium, e.g. Nd:YAG, the laser wavelength is defined by the crystal structure energy levels and is generally well determined and narrow band (excepting certain crystals and dopants such as Ti:Sapphire which show widely tunable laser action). For semiconductor pump sources, the gain bandwidth is typically quite broad, and a further frequency selective element must be provided to determine the laser wavelength and bandwidth. This frequency selective element may be placed inside the cavity 1705, where it may be an etalon or narrow band filter, or it may be incorporated into one of the two cavity mirrors in the form of a Bragg reflection grating. Thirdly, a Bragg reflection grating 1706 may be deployed outside the main laser cavity to provide wavelength selective feedback to the laser pump source to determine the laser wavelength. For optimum efficiency with the frequency converter of the present invention, the frequency converter should be positioned such that the pump beam travels through the optimum 50/50 duty cycle portion of the crystal which is ensured by the tapered domain structure.

Since the conversion efficiency of the second harmonic generator is proportional to the square of the pump power, more efficient energy conversion can generally be obtained from a pulsed laser source than from a CW laser. Increasing the peak and average powers too much however can cause crystal damage, such as surface damage at the polished faces, or residual photorefractive effects which are not compensated by the MgO dopant at very high optical powers. For this reason, for some applications where high visible powers are required, it may be preferable to provide an array of pump beams coupled into different regions of the same frequency conversion chip. In this way, the power in each individual beam can be maintained well below the material damage thresholds, while the total output power from all the beams can be scaled as high as several watts to 10 watts of power. The frequency converter enabled by the present invention is ideal for this application since it provides high peak conversion efficiency and high lateral uniformity for uniform and efficient frequency doubling performance across an entire array of laser beams.

An example of an application which benefits strongly from the array scalability of the frequency converter enabled by the present invention is that of laser projection displays. In this case, the fact that the total output power is made up of a number of individual beams is not a disadvantage, since a single mode diffraction limited optical beam is not generally required. In fact, multiple beams each with slightly different wavelengths helps to reduce the speckle effect which can otherwise render laser displays uncomfortable to watch.

Figure 18:
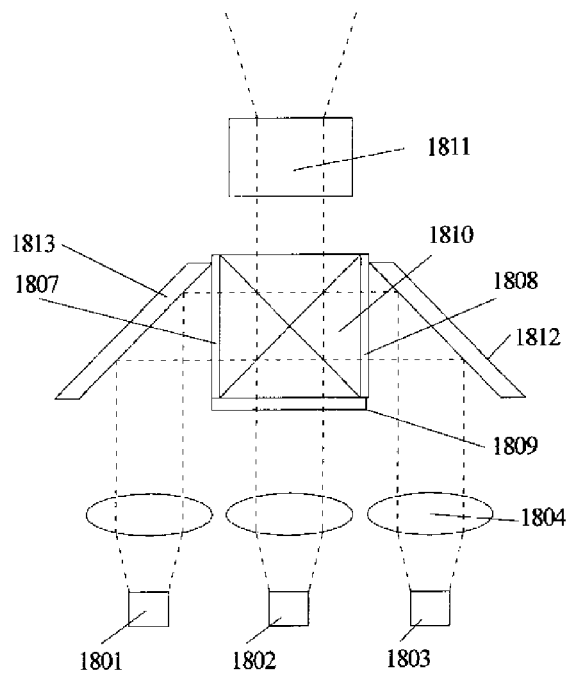
FIG. 18. illustrates a projection laser light display system for one embodiment of the present invention.

An example of a laser light source for projection display applications is shown in FIG. 18. At present, most projection displays are illuminated by a high pressure mercury bulb. This bulb is inefficient at generating visible light, and the optical components required to capture a significant proportion of the light that is generated and project it onto the screen are complex and relatively expensive. In addition, a color wheel or color filters must be used to separate the three primary colors (red, green and blue) either spatially or temporally. A laser light source on the other hand simplifies many of these issues and offers some advantages for the display. Firstly the laser light source can provide a wider color gamut than the lamp by producing narrower bandwidth light at the primary colors, leading to a richer, more saturated and natural looking color display. Secondly the optical coupling and projection optics for the laser beam are significantly simpler than those for the lamp, since the laser beams are essentially collimated and do not need fast (wide aperture) collection optics. Thirdly the properties of the laser enable some of the other components to be removed from the optical system decreasing the complexity and cost. In the laser light source of FIG. 18, laser light at the three primary colors is generated by modules 1801, 1802, 1803, utilizing frequency doubling of semiconductor diode lasers using the periodically poled MgO:CLN frequency conversion device of the present invention. Collecting optics 1804 collimate the light, overlap the multiple beams from the array, and match the optical beam to the form factor of the spatial light modulators 1807, 1808, 1809, which in this embodiment are transmission LCD panels, for instance from Epson Corp. The laser is advantageous for the use of LCD panels since the laser light is linearly polarized matching the optimum requirement for the LCD panel operation. The spatially modulated light at the three primary colors is combined in an x-prism 1810 and the image projected onto the screen (not shown) via the projection optics 1811. This embodiment has described a 3-LCD projection system wherein the use of the laser enables the elimination of the complex collection optics required by the lamp, as well as various color separation filters and polarizers that are required to split the lamp output into linearly polarized beams at the primary colors.

The array scaling capability of the frequency converter of the present invention is key to generating the power levels that are required for a projection display. For instance, 2.0 W of 465 nm blue, 1.6 Watts of 532 nm green and 2.2 Watts of 635 nm red laser light will provide 1400 lumens, which after traveling through the typical spatial light modulators and projection optics should yield around 400 lm on the screen. For brighter displays, even more optical power is needed, leading to the desire to reliably produce 4-5 watts of light in each primary color.

An alternative embodiment for the projection display uses a digital micro-mirror device (DMD, Texas Instruments) as the spatial light modulator. In this embodiment, the light output from the three primary-color second harmonic generation laser modules are spatially overlapped before the spatial light modulator. Time sequencing of the light output from the laser modules is used to provide color-sequential operation using a single spatial light modulator—alternatively a separate SLM can be used for each primary color and the images superimposed after the SLM. The light output from the SLM is projected onto the screen by the projection optics. In this embodiment the laser light sources enable the elimination of the rotating color wheel which is currently used to provide color-sequential light output from the continuous wave mercury lamp, as well as simplifying the collection and projection optics.

It should be noted that although the above projection display embodiments have been described with reference to full color, 3-primary source displays, it may in some cases be preferable to provide more or less than 3 primary colors. For instance, by providing 4 or 5 colors, the overall color gamut of the display can be increased and a wider range of natural colors can be displayed. On the other hand, a simpler and cheaper display device can be provided with only a single color, producing a monochrome display with potentially much more compact dimensions and lower cost. The frequency converter of the present invention is particularly valuable for the small dimension and low cost projection display device, often termed the pocket projector. This is because the frequency conversion device enabled by the present invention has the combined properties of highly efficient operation, high uniformity, high manufacturing yield, and fabrication in a commercially available substrate material. This enables, for the first time, the prospect of scaling the manufacturing cost of a precision designed and fabricated periodically poled nonlinear optical crystal down to the few dollar price point required for mass volume manufacturing for consumer electronics applications.

Figure 19:
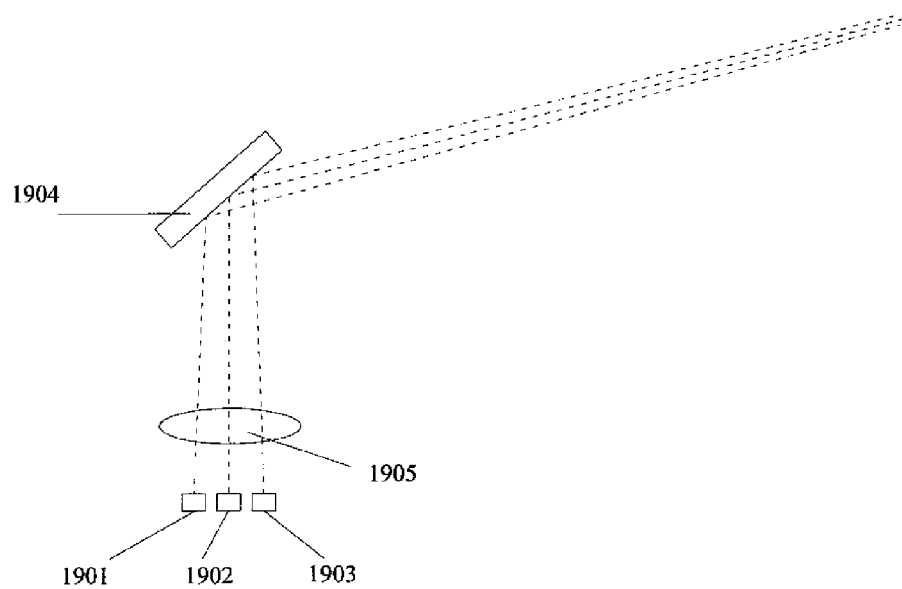
FIG. 19. illustrates a scanning laser light display system for one embodiment of the present invention.

An alternative approach to the projection display, especially for compact and low power devices is that of directly scanning the image over the screen, using for instance 1 or 2 axes MEMS (micro-electrical mechanical systems) scanners. This is shown schematically in FIG. 19. In this case, the primary color laser modules (which generate visible light using the frequency converter of the present invention) 1901, 1902, 1903 are imaged onto the scanning system 1904 by the coupling optics 1905. The scanning system 1904 may be composed of a single 2-axis scanner, or of a single axis scanner and a rotating faceted drum, or two single axis scanners or any other image scanning technique know in the art. The scanner directs the color beams to the screen (not shown) and the image is written to the screen using, for instance, raster or vector scanning. Brightness and color information is encoded by time domain modulation of the laser output power, either by directly modulating the pump laser power, or by providing a modulator integrated into the frequency converter, or located outside the frequency conversion module. The device structure and assembly are simplified by the lack of the spatial light modulator, which also offers the prospect of lower device cost, albeit accompanied by a reduced performance in terms of brightness and image resolution.

Figure 20:
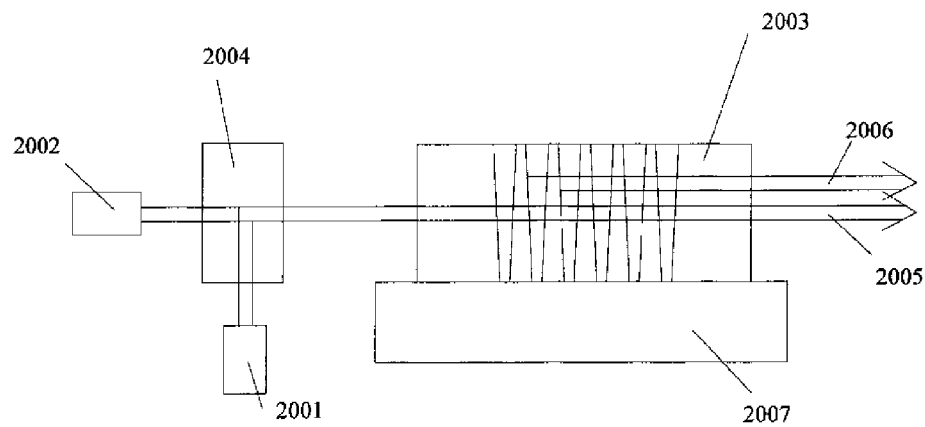
FIG. 20. illustrates a difference frequency generator using a domain grating device for one embodiment of the present invention.

Another application of the improved optical frequency converter is in the generation of infra-red light for use for example in remote gas sensing, countermeasures and Lidar. Infra-red wavelengths are generated with a difference frequency converter or an optical parametric oscillator. FIG. 20 shows a difference frequency converter using the present invention. Two pump lasers 2001, 2002 are coupled into the frequency converter 2003 by coupling means 2004 which may consist of one or more lenses to focus or collimate the pump laser beams. The quasi-phasematched domain inversion grating in the frequency converter 2003 transfers optical energy from the two pump lasers into a third beam 2006 (which is actually generally collinear with the combined pump beam 2005) with a frequency equal to the difference between the frequencies of the pump lasers. The temperature controller 2007 controls the temperature of the chip to provide maximum conversion efficiency. In this way, a pump beam from an Nd:YAG laser at 1064 nm mixes with a diode laser at 810 nm to create a difference frequency beam at about 3.4 µm. Alternatively, the difference frequency generator can be used for telecom wavelength conversion and dispersion compensation applications. In this case a pump beam at 775 nm is combined with a signal beam at around 1550 nm to generate an idler beam also around 1550 nm. In this configuration the signal and idler beams can range from around 1520 nm to 1570 nm due to the slow variation of the refractive index around the 1550 nm wavelength in lithium niobate. By using a different (shorter) grating period, the frequency conversion device can be used for sum frequency generation. For example, a 1480 nm laser and a 920 nm laser can be mixed to create 567 nm yellow light for medical applications.

An alternative configuration for generating infra-red light is the optical parametric oscillator (OPO), where a single pump beam is used and one or both of the signal and idler wavelengths are resonated in a cavity formed by mirrors placed around the frequency converter as is well known in the art. Once above threshold, (i.e. at high enough pump levels to cause oscillation) the OPO is very efficient in transferring energy from the pump to the signal and idler beams.

Although the present invention has been described in detail with reference to magnesium oxide doped congruent lithium niobate, MgO:CLN, it is equally applicable to other nonlinear optical materials known in the art including: undoped congruent lithium niobate and tantalate, stoichiometric lithium niobate and tantalate materials, either grown from the melt or prepared by vapor transport equilibrium, magnesium doped stoichiometric lithium niobate and tantalate, Ti doped and Ti diffused CLN, SLN and SLT and similar materials with other dopants designed to reduce the photorefractive effect such as zinc doped congruent lithium niobate.

The detailed discussion of the present invention has been presented with reference to a substrate thickness of 0.5 mm since this is a standard, commercially available substrate dimension. The present invention is equally applicable to both thinner and thicker substrates, in particular 0.25 mm and 1.0 mm substrates. Thicker substrates, such as 2 mm and 3 mm, can be readily poled using this technique for high power applications especially in infra red generating devices. There is no limitation on the wafer diameter or transverse dimensions of the substrate. If the illumination system cannot uniformly illuminate the entire substrate at once, the surface of the substrate may simply be masked off with an opaque material, such as dicing tape, and the domain inversion process performed in sections across the substrate.

In one embodiment, the present invention relates to the fabrication of domain inverted structures. Generally the applications for these domain inverted devices are in the field of optical frequency conversion using quasi-phase matching to provide efficient energy transfer from one wavelength to another. Whilst the present invention has been described in detail with reference to domain inversion gratings, it should be understood that quasi-phasematched devices may contain periodic, aperidoic and pseudo-random phase reversal structures as required to produce the desired phasematching curve. In addition, whilst a grating generally consists of a multiple number of features arrayed periodically or aperiodically, in a domain inverted device it may consist of as few as two domains, requiring only a single domain boundary. Domain inversion devices may also be used for applications other than optical frequency conversion, such as polarization rotation (TE-TM conversion), optical switching and optical beam deflection.

Throughout the embodiments described above, reference has been made to the front and back surfaces of the crystal substrate. These faces are not fixed with respect to the crystal orientation and depend on the photolithographically applied mask layers and the direction of the illumination applied to the crystal. In general, the photolithographically masked face is referred to as the front face, and the spatially uniform illumination is incident on the back face.

No limitations have been set on the period of the domain inversion grating that can be realized with the techniques of the present invention. Isolated domains with submicron dimensions have been observed, offering the prospect of domain inversion gratings with periods of less than 2 μm for quasi-phasematching of UV interactions. The visible frequency conversion applications which are the most promising application of the present invention require periods ranging from ~4 μm for the blue, through ~7 um for the green up to ~12 μm for the red. There is also no upper limit to the period which can be fabricated, in fact isolated domains can be reliably fabricated using the present invention with high repeatability and precise domain size control for use in applications such as beam deflectors or optical total internal switches.

Although both the device fabrication and applications have been written with reference to bulk frequency conversion applications, the frequency conversion device fabricated by the present invention can also be used as a substrate for highly efficient waveguide frequency conversion applications. In this case, the tapered domain structure does not ensure that there is a 50/50 duty cycle within the waveguide region, but by careful control of the poling parameters the grating duty cycle at one of the two crystal faces can be controlled to be substantially 50/50 for $1^{st}$ order quasi-phasematching. Optical waveguides can be fabricated in the MgO:CLN substrate using any of the techniques known in the art, such as annealed proton exchange (APE), reverse proton exchange (RPE), titainium indiffusion and zinc indiffusion. In the fabrication sequence for APE and RPE devices the waveguide and periodic poling steps can be performed in any order since neither substantially affects the capability to perform the other. With the metal indiffusion waveguides the waveguide process is preferably performed first so that it does not disturb the short period domain inversion during the high temperature process. In this instance the present invention is particularly important since the mobile charge electrode enables high quality domain inversion to be generated even through the metal indiffused waveguide regions. In general the same fabrication techniques are applied to waveguide frequency converters as for the bulk embodiments described above. The design approach for the devices is very similar, the optical waveguide mode effective index is used to compute the required grating period for a given wavelength rather than the bulk crystal refractive index.

The embodiments described above serve the purpose of demonstrating the principle of the current invention. A person with ordinary skill-in-the art can derive more specific embodiments beyond those described here that are in the spirit of the current invention. Techniques described in the different embodiments can be freely combined to produce further embodiments which enhance the control of the domain growth.

The invention claimed is:

1. A domain grating device, comprising:
    a substrate with first and second opposing surfaces,
    the substrate having an inverted domain grating structure which extends through the entire substrate; and
    wherein, an inverted domain duty cycle at the first surface is greater than 50% and less than 100%, and an inverted domain duty cycle at the second surface is less than 50% and greater than 0%.

2. The device of claim 1, wherein the substrate is a ferroelectric substrate.

3. The device of claim 1, wherein the substrate is made of a material selected from at least one of, MgO doped congruent lithium niobate, stoichiometric Lithium Niobate, Stoichiometric Lithium Tantalate, MgO:Stoichiometric Lithium Niobate, MgO:Stiochiometric Lithium Tantalate, ZnO: Lithium Niobate, In:Lithium Niobate, Ti:Lithium Niobate and Er:Lithium Niobate.

4. The device of claim 1, wherein a thickness of the substrate is between 100 μm and 2 mm.

5. The device of claim 1 wherein a thickness of the substrate is between 450 μm and 550 μm.

6. The device of claim 1 wherein a thickness of the substrate is between 950 μm and 1150 μm.

7. The device of claim 1, wherein a thickness of the substrate is at least 2 mm.

8. The device of claim 1, wherein said grating structure has an average period between 4 μm and 13 μm.

9. The device of claim 1, wherein said grating structure has an average period of less than 4 μm.

10. The device of claim 1, wherein said grating structure has an average period that is greater than 15 μm and the substrate has a thickness greater than 1 mm.

11. The device of claim 1, wherein the inverted domains are tapered in size from the first surface to the second surface.

12. The device of claim 1, wherein a domain pattern on each of the first and second surfaces is a visible domain pattern.

13. The device of claim 12, wherein the visible domain pattern is used to predict a performance of the frequency converter for process yield purposes.

14. The device of claim 1, wherein the surface at which the inverted domains have a greater duty cycle is the surface where a pattern electrode is disposed during a poling process.

15. The device of claim 1, further comprising:
a repeated inverted domain grating structure extending through the entire substrate forming a frequency conversion device;
a laser pump source; and
a means configured to provide phasematching between said laser pump source and said frequency conversion device.

16. The device of claim 15, where said means configured to provide phasematching between said laser pump source and said frequency conversion device is a heating device configured to maintain a particular temperature of said frequency conversion device.

17. The device of claim 15, where said means configured to provide phasematching between said laser pump source and said frequency conversion device is a means to tune the wavelength of the pump source to match that of the frequency converter.

18. The device of claim 15, where said laser pump source comprises a semiconductor diode laser.

19. The device of claim 15, where said laser pump source comprises a diode pumped solid state laser.

20. The device of claim 15, where the optical beam emitted by said pump laser source passes through the region of the domain grating which has substantially 50% duty cycle.

21. The device of claim 15, further comprising a means for efficient optical coupling between said laser pump source and said frequency conversion device.

22. The device of claim 15, wherein the inverted domain device is incorporated inside the laser cavity of said pump laser.

23. The device of claim 15, wherein the inverted domain device is at least partially coated with a conductive coating forming a charge dissipating closed-loop.

24. The device of claim 15, wherein said pump laser source comprises a plurality of individual laser beams.

25. The device of claim 15, wherein the substrate is made of a material selected from at least one of, MgO doped congruent lithium niobate, stoichiometric Lithium Niobate, Stoichiometric Lithium Tantalate, MgO:Stoichiometric Lithium Niobate, MgO:Stoichiometric Lithium Tantalate, ZnO: Lithium Niobate, In:Lithium Niobate, Ti:Lithium Niobate and Er:Lithium Niobate.

26. The device of claim 15, wherein a thickness of the substrate is between 100 µm and 2 mm.

27. The device of claim 15, wherein a period of the grating structure is between 4 µm and 7 µm.

28. The device of claim 15, wherein inverted domains are tapered in size from the first surface to the second surface.

29. The device of claim 15, further comprising:
an optical coupling means;
a spatial light modulator;
a projector lens element; and
a screen.

30. The device of claim 29, wherein the substrate is made of a material selected from at least one of, MgO doped congruent lithium niobate, stoichiometric Lithium Niobate, Stoichiometric Lithium Tantalate, MgO:Stoichiometric Lithium Niobate, MgO:Stiochiometric Lithium Tantalate, ZnO: Lithium Niobate, In:Lithium Niobate, Ti:Lithium Niobate and Er:Lithium Niobate.

31. The device of claim 29, wherein a thickness of the substrate is between 100 µm and 2 mm.

32. The device of claim 29, wherein the grating structure has an average period between 4.0 µm and 13 µm.

33. The device of claim 32, wherein inverted domains are tapered in size from the first surface to the second surface.

34. A method of creating a domain grating device in a substrate comprising:
providing electrical contacts to first and second opposing surfaces of said substrate;
generating mobile charges in said substrate; and,
applying potentials to said electrical contacts creating a patterned current flow through said substrate;
forming an inverted domain grating structure, wherein a domain duty cycle at the first surface is greater than 50% and less than 100%, and a domain duty cycle at the second surface is less than 50% and greater than 0%.

35. The method of claim 34, wherein a domain duty cycle at the first surface is greater than 50% and less than 100%, and a domain duty cycle at the second surface is 0%.

36. The method of claim 34, wherein mobile charges are generated in the substrate in combination with the application of a patterned electric field.

37. The method of claim 34, further comprising the steps of
annealing the domain grating device at a temperature between 500 and 650 degrees centigrade for a time of between 24 and 72 hours
providing a closed-loop electrical discharge path between the opposing faces of the domain grating device during said annealing.

38. The method of claim 34, further comprising:
generating said mobile charges by exposing the substrate to substantially spatially uniform optical illumination through at least one of the first and second surfaces to form an illuminated face.

39. The method of claim 38, wherein the optical illumination consists of wavelengths from 250 nm to 600 nm.

40. The method of claim 38, wherein the optical illumination consists of wavelengths greater than or equal to 400 nm.

41. The method of claim 38, wherein the optical illumination is filtered to remove wavelengths shorter than 320 nm.

42. The method of claim 38, further comprising:
disposing a uniform transparent electrode on the illuminated face.

43. The method of claim 42, further comprising:
disposing a patterned electrode on an opposite face relative to the illuminated face.

44. The method of claim 43, further comprising:
applying a high voltage to the electrical contacts to cause a photocurrent to flow through the substrate; and
controlling a magnitude and duration of the high voltage and illumination to create a domain inversion structure through the thickness of the substrate.

45. The method of claim 44, further comprising:
applying illumination to the substrate simultaneously with application of a first voltage.

46. The method of claim 45, further comprising:
terminating the application of illumination in response to a parameter selected from at least one of, time, current flow and charge transfer.

47. The method of claim 46, further comprising:
applying a second voltage to the substrate crystal after the illumination is terminated to cause a poling current to flow.

48. The method of claim 47, further comprising:
terminating the second voltage in response to a parameter selected from at least one of, time, current flow and charge transfer to create a domain inversion structure wherein a domain duty cycle at the first surface is greater than 50% and less than 100%, and a domain duty cycle at the second surface is less than 50% and greater than 0%.

49. The method of claim 48, further comprising:
applying a time delay between termination of the illumination and application of the second voltage.

* * * * *